United States Patent
Lee et al.

(10) Patent No.: US 10,694,159 B2
(45) Date of Patent: Jun. 23, 2020

(54) BACKLIGHT MODULE AND DISPLAY DEVICE USING THE SAME

(71) Applicant: AU Optronics Corporation, Hsin-Chu (TW)

(72) Inventors: Keng-Yi Lee, Hsin-Chu (TW); Yu-Chin Wu, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 16/428,003

(22) Filed: May 31, 2019

(65) Prior Publication Data

US 2019/0379867 A1    Dec. 12, 2019

(30) Foreign Application Priority Data

Jun. 6, 2018 (TW) .............................. 107119530 A
Apr. 16, 2019 (TW) .............................. 108113258 A

(51) Int. Cl.
*H04N 9/31* (2006.01)
*F21V 8/00* (2006.01)
*G03B 21/14* (2006.01)

(52) U.S. Cl.
CPC ......... *H04N 9/3141* (2013.01); *G02B 6/0031* (2013.01); *G03B 21/145* (2013.01)

(58) Field of Classification Search
CPC .. G03B 21/006; G03B 21/145; G03B 21/208; G03B 21/2013; G03B 21/2033; G03B 21/2066; G02F 1/011; G02F 1/015; G02F 1/0102; G02F 1/1326; G02F 1/133308; G02F 1/133524; H04N 9/20; H04N 9/3141; H04N 9/3161
See application file for complete search history.

(56) References Cited

U.S. PATENT DOCUMENTS

| | | | |
|---|---|---|---|
| 8,634,039 B2 | 1/2014 | Lai et al. | |
| 9,019,444 B2 | 4/2015 | Tang | |
| 2004/0048026 A1 | 3/2004 | Kan | |
| 2013/0208503 A1* | 8/2013 | Yu | G09F 13/18 362/609 |
| 2013/0208509 A1 | 8/2013 | Cheng et al. | |
| 2018/0335667 A1* | 11/2018 | Wang | G02F 1/133615 |

FOREIGN PATENT DOCUMENTS

| | | |
|---|---|---|
| TW | I456311 B | 10/2014 |
| TW | I475297 B | 3/2015 |
| TW | I642999 B | 12/2018 |

* cited by examiner

*Primary Examiner* — Sultan Chowdhury
(74) *Attorney, Agent, or Firm* — WPAT, PC

(57) ABSTRACT

The backlight module includes a bracket, a light emission module, a reflective film, and first glue structures. The bracket has a first plate and a second plate opposite to each other, and a third plate connecting the first plate to the second plate. The light emission module is disposed between the first plate and the second plate and includes light emission elements. The reflective film is disposed between the light emission elements and the first plate. The reflective film is mounted on the first plate of the bracket through the first adhesive structures. The first adhesive structures vertically project on the first plate at a plurality of first areas respectively, the light emission elements vertically project on the first plate at a plurality of second areas respectively, and the first areas do not overlap with the second areas.

21 Claims, 21 Drawing Sheets

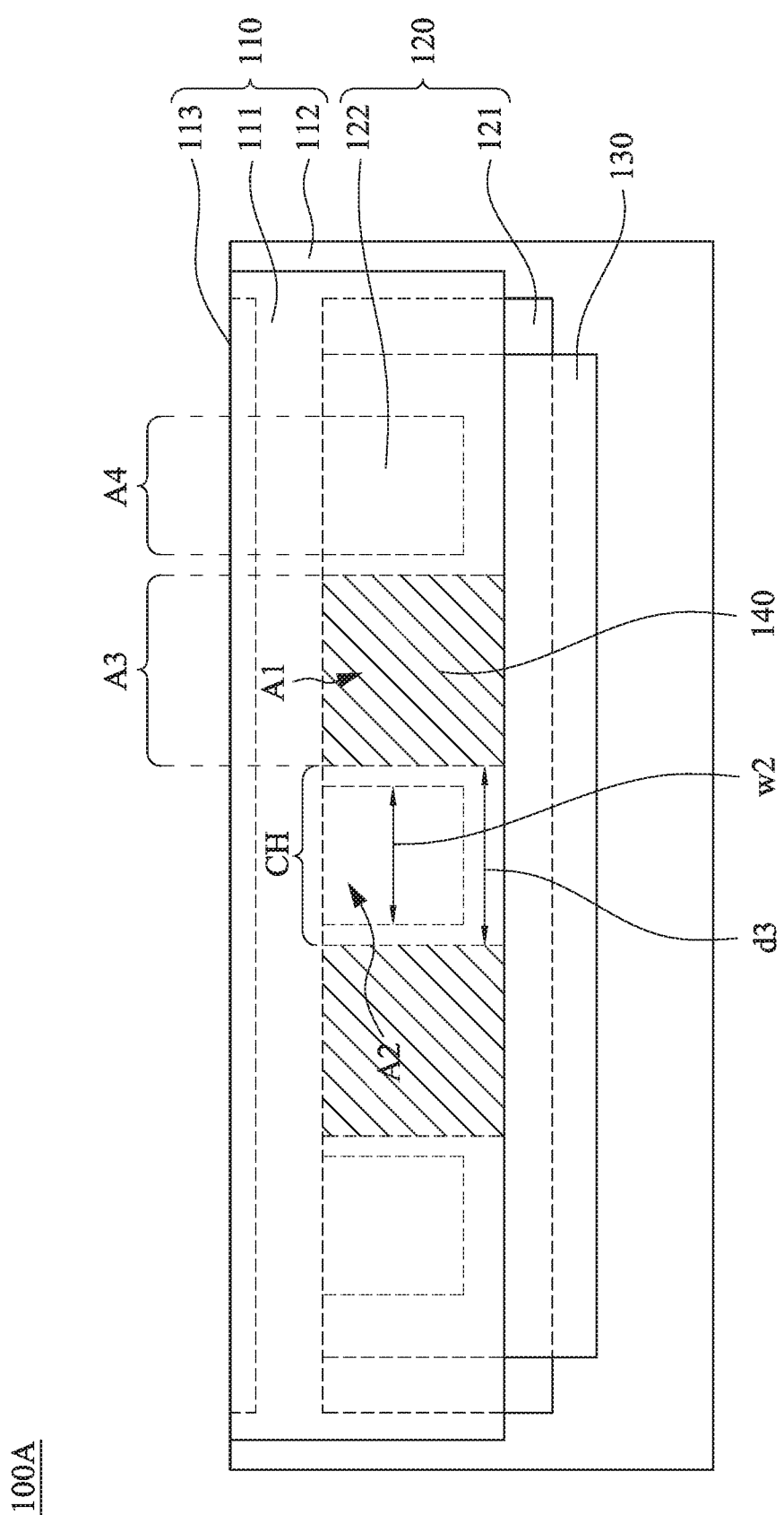

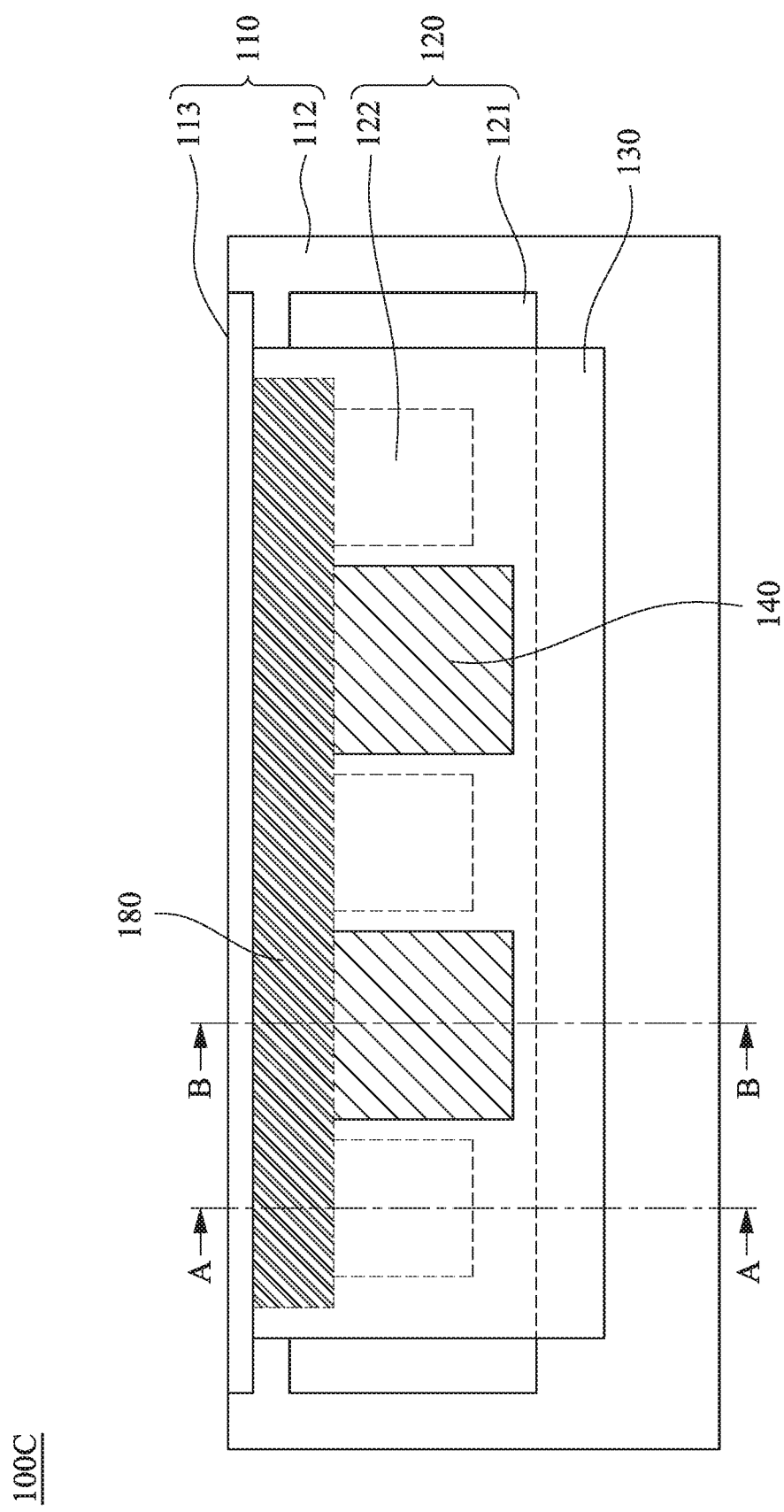

BACKLIGHT MODULE AND DISPLAY DEVICE USING THE SAME

RELATED APPLICATIONS

This application claims priority to Taiwanese Application Serial Number 107119530, filed Jun. 6, 2018, and Taiwanese Application Serial Number 108113258, filed Apr. 16, 2019, the entirety of each of which is incorporated by reference herein.

BACKGROUND

Field of Invention

The present invention relates to a backlight module and a display device.

Description of Related Art

Generally, components of an edge backlight module include light-emitting elements and a light guide plate, in which light-emitting diodes (LEDs) are widely used as the light-emitting elements. Electronic devices are becoming increasingly thinner and lighter, and thus, the thickness of the backlight modules needs to be reduced accordingly. However, it is difficult to reduce the thickness of the backlight module. For example, the cost of reducing the thickness of LEDs is quite high. Moreover, assembly of the backlight module becomes more difficult when the size of the backlight module is reduced. For example, the adhesive used on a bracket of the backlight module may be too thick and may block entrance of the light guide plate into the bracket. If a light guide plate having a thinner thickness is used in the backlight module, the size of the LEDs does not match the light guide plate, and a gap formed therebetween may lead to light leakage of the backlight module.

SUMMARY

An aspect of the disclosure provides a backlight module. The backlight module includes a bracket, a light emission module, a reflective film, and first glue structures. The bracket has a first plate and a second plate opposite to each other, and a third plate connecting the first plate to the second plate. The light emission module is disposed between the first plate and the second plate, and includes light emission elements. The reflective film is disposed between the light emission elements and the first plate. The reflective film is mounted on the first plate of the bracket through the first adhesive structures. The first adhesive structures vertically project on the first plate at a plurality of first areas respectively, the light emission elements vertically project on the first plate at a plurality of second areas respectively, and the first areas do not overlap with the second areas.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 3B is a schematic top view of the backlight module of FIG. 1 after the light emission module is assembled into the bracket;

FIGS. 7A and 7B are schematic top views at different assembling stages of an embodiment of the backlight module of the present disclosure;

DESCRIPTION OF THE EMBODIMENTS

Figure 1:
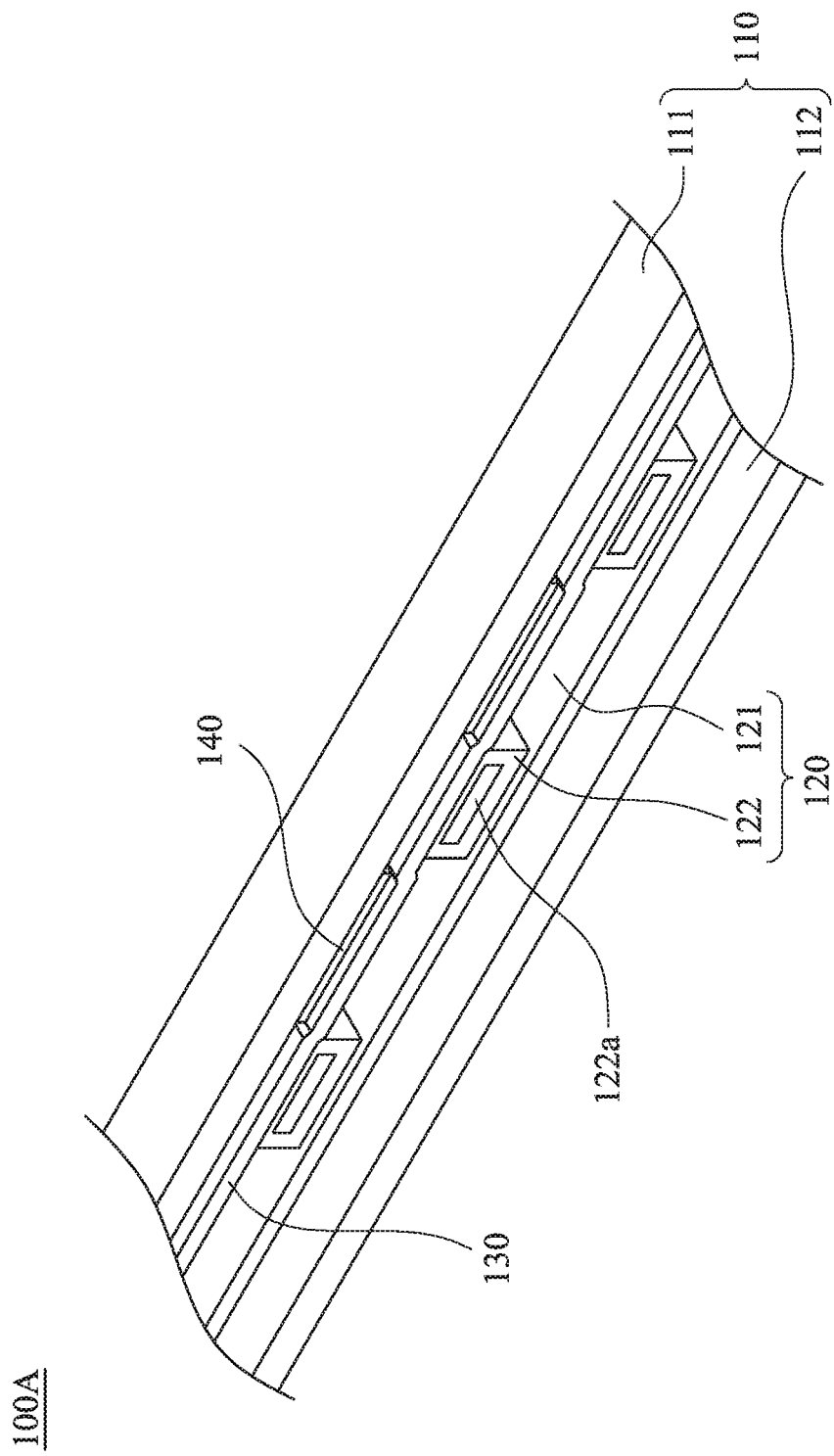
FIG. 1 is a partial perspective view of an embodiment of a backlight module of the present disclosure.

Reference will now be made in detail to the present embodiments of the invention, examples of which are illustrated in the accompanying drawings. Wherever possible, the same reference numbers are used in the drawings and the description to refer to the same or like parts.

The term "substantially" in the whole disclosure refers to the fact that embodiments having any tiny variation or modification not affecting the essence of the technical features can be included in the scope of the present disclosure.

Reference throughout the specification to "some embodiments" means that a particular feature, structure, implementation, or characteristic described in connection with the embodiments is included in at least one embodiment of the present disclosure. Thus, uses of the phrase "in some embodiments" in various places throughout the specification are not necessarily all referring to the same embodiment. Furthermore, the particular features, structures, implementation, or characteristics may be combined in any suitable manner in one or more embodiments.

Figure 2:
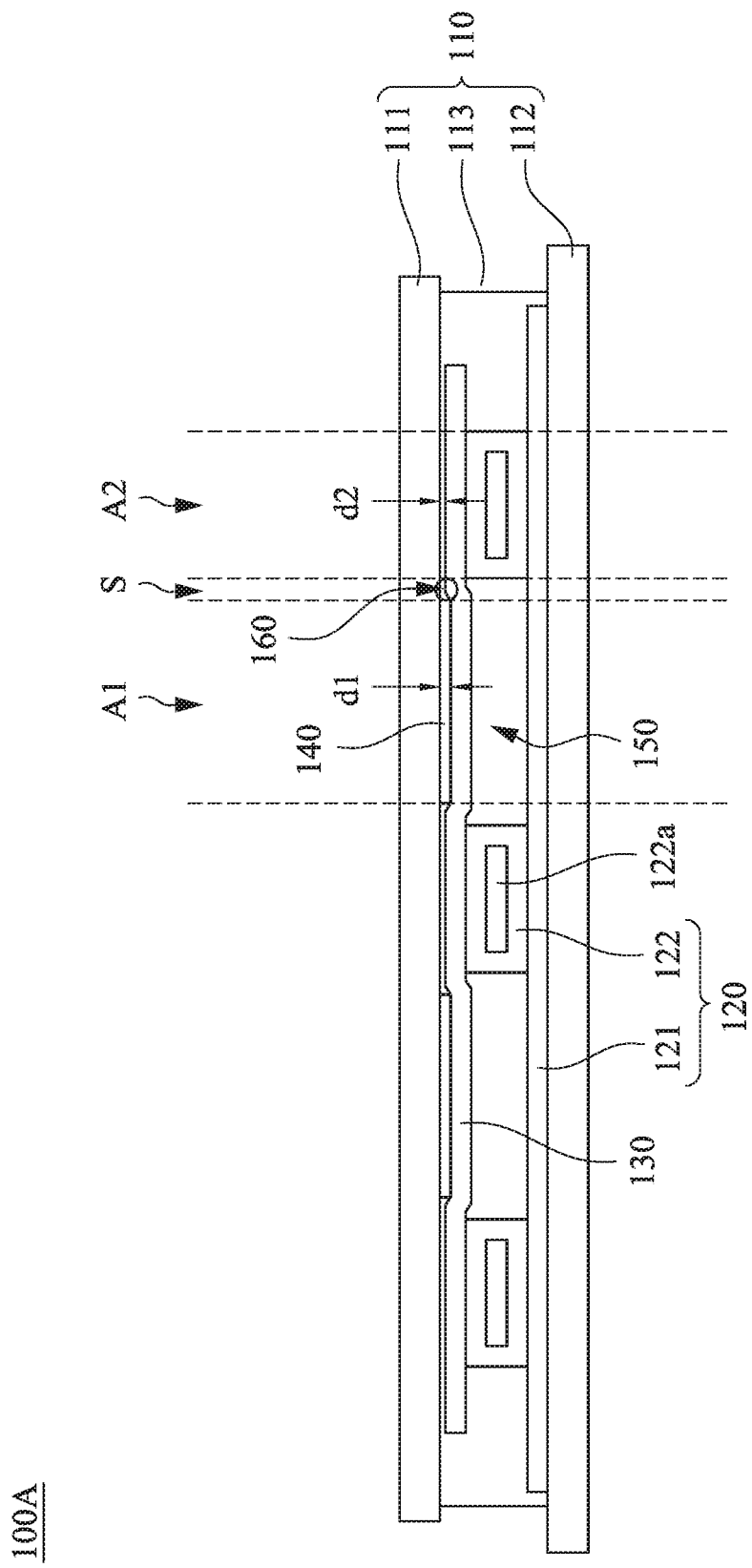
FIG. 2 is a front view including light emitting surfaces of a light emission module of the backlight module of FIG. 1.

Reference is made to FIG. 1 and FIG. 2. FIG. 1 is a partial perspective view of an embodiment of a backlight module 100A of the present disclosure. FIG. 2 is a front view including light emitting surfaces 122a of a light emission module 120 of the backlight module 100A of FIG. 1. The backlight module 100A includes a bracket 110, a light emission module 120, a reflective film 130, and a plurality of first adhesive structures 140. The bracket 110 includes a first plate 111, a second plate 112, and a third plate 113, in which the first plate 111 and the second plate 112 are arranged opposite to each other, and the third plate 113 is arranged to interconnect the first plate 111 and the second plate 112. The light emission module 120 is disposed between the first plate 111 and the second plate 112, and the light emission module 120 includes a circuit substrate 121 and a plurality of light emission elements 122 on the circuit substrate 121. The reflective film 130 is disposed between the light emission module 120 and the first plate 111. The first adhesive structures 140 are disposed between the reflective film 130 and the first plate 111. The first adhesive structures 140 vertically project on the first plate 111 at a plurality of first areas A1, respectively. The light emission elements 122 vertically project on the first plate 111 at a plurality of second areas A2, respectively. The first areas A1 do not overlap with the second areas A2. Because the projections of the first adhesive structures 140 and the light emission elements 122 on the first plate 111 of the bracket 110 are different, the thickness of the backlight module 100A can be reduced, and thus, the thickness of the display device can be reduced accordingly.

The light emission elements 122 of the light emission module 120 are disposed on the circuit substrate 121. The circuit substrate 121 is disposed between the light emission elements 122 and the second plate 112. The light emission elements 122 can be disposed between the circuit substrate 121 and the reflective film 130. The circuit substrate 121 is electrically connected to the light emission elements 122 to control the brightness of the light emission elements 122 through external signals. In some embodiments, the circuit substrate 121 can be a flexible printed circuit board, and the light emission elements 122 can be LEDs, or any other suitable components.

As illustrated in FIG. 1 and FIG. 2, in this embodiment, each of the light emission elements 122 has a light emitting surface 122a. The light emitting surface 122a is disposed at a side which is facing away from the third plate 113 of the light emission element 122. Therefore, the light emission elements 122 can directly emit light from the inside of the bracket 110 toward the outside of the bracket 110. In some embodiments, reflective material can be optionally coated or disposed on the third plate 113, to reflect light that is emitted from the light emission elements 122 toward the third plate 113. As a result, most of the light emitted from the light emission elements 122 emits from the bracket 110 in a direction that is away from the third plate 113.

Figure 5A:
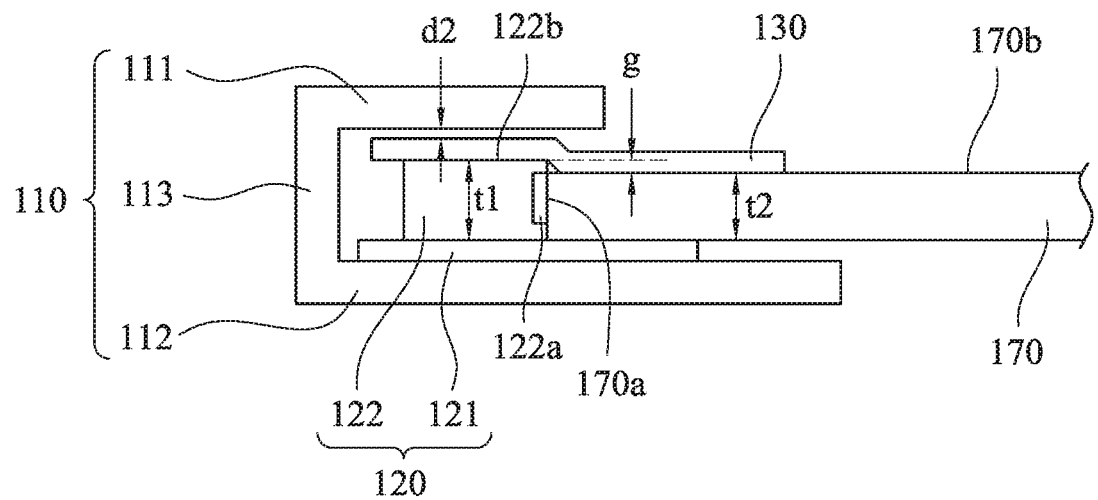
FIG. 5A is a cross-sectional view of the backlight module taken along the line A-A of FIG. 4.

The reflective film 130 is disposed on a surface of the first plate 111 which faces the second plate 112, and the reflective film 130 extends outwardly. The reflective film 130 is adhered on the first plate 111 through the first adhesive structures 140. Due to problems of fabrication tolerances, assembly tolerances, and/or gaps between the components, spaces may be present between the bracket 110 and a light guide plate 170 (as shown in FIG. 5A). The reflective film 130, which is disposed between the bracket 110 and the light guide plate 170 and extends from the first plate 111 outwardly, may serve as a joint between the components. Through such a configuration, light does not leak out from the spaces, and the problem of light leakage can be prevented.

In some embodiments, the reflective film 130 has a very thin thickness and is flexible. The flexible reflective film 130 can provide a better joining ability between the bracket 110 and the light guide plate 170. In addition, the reflective film 130 is made of a material that has high reflectance to the light from the light emission elements 122. For example, the reflective film 130 can include $BaSO_4$, $TiO_2$, Ag, Polypeopylene (PP), cyclo-olefin polymers (COP), or combinations thereof. These illustrative materials are not intended to limit the present disclosure, and other suitable materials can be chosen according to practical requirements.

As illustrated in FIG. 1 and FIG. 2, in some embodiments, the first adhesive structures 140 press the reflective film 130 and the underlying light emission module 120, such that the light emission module 120 is also pressed by the first adhesive structures 140 and is fastened in the bracket 110. The first adhesive structures 140 can be made of any suitable material, such as a double-sided tape, a foam tape, or the like.

As shown in FIG. 2, in each of the first areas A1, an air layer 150 is formed between the reflective film 130 and the second plate 112. Furthermore, at a projection plane parallel to the first plate 111, each of the air layers 150 is disposed between an adjacent two of the light emission elements 122.

In a direction perpendicular to the first plate 111, the thickness of the air layer 150 is smaller than the thickness of the light emission element 122. Therefore, the portions of the reflective film 130 in the second areas A2 are pushed by the light emission elements 122 and are moved toward the first plate 111. Namely, in the first area A1, a first distance d1 is defined from the reflective film 130 to the first plate 111; in the second area A2, a second distance d2 is defined from the reflective film 130 to the first plate 111. Because the reflective film 130 is pressed by the light emission elements 122, the second distance d2 is smaller than the first distance d1. In some embodiments, because of the flexibility of the reflective film 130, the reflective film 130 presses against the light emission elements 122 toward the second plate 112 in the second areas A2, thereby holding the light emission module 120 in the bracket 110.

In some embodiments, at a projection plane on the first plate 111, the first adhesive structures 140 and the light emission elements 122 are arranged alternately. That is, at the projection plane on the first plate 111, one of the first adhesive structures 140 is disposed in a space between an adjacent two of the light emission elements 122. Moreover, an adjacent two of the light emission elements 122 are spaced apart by the air layer 150, and the thickness of the air layer 150 is smaller than the thickness of the light emission elements 122. As a result, the reflective film 130 can press against the light emission elements 122 to fasten the light emission module 120 in the bracket 110. By using the above fastening method, the amount of the adhesive between the light emission module 120 and the bracket 110 can be reduced, and the light emission module 120 can be assembled into the bracket 110 more easily.

As shown in FIG. 2, at the projection plane parallel to the first plate 111, a section S is formed between one of the first areas A1 and one of the second areas A2 adjacent to each other. Namely, at the projection plane parallel to the first plate 111, the light emission elements 122 are not directly connected to the first adhesive structures 140. In some embodiments, at the projection plane parallel to the first plate 111, the light emission elements 122 and the first adhesive structures 140 are spaced apart by a plurality of air gaps 160. The air gaps 160 are disposed between the first plate 111 and the reflective film 130, and a projection of each of the air gaps 160 on the first plate 111 is located within the sections S. That is, at the projection plane parallel to the first plate 111, each of the air gaps 160 is arranged between one of the first areas A1 and the adjacent second area A2. The air gaps 160 serve as buffer spaces when the light emission module 120 is assembled into the bracket 110, such that the light emission module 120 can enter the bracket 110 more easily.

Figure 3A:
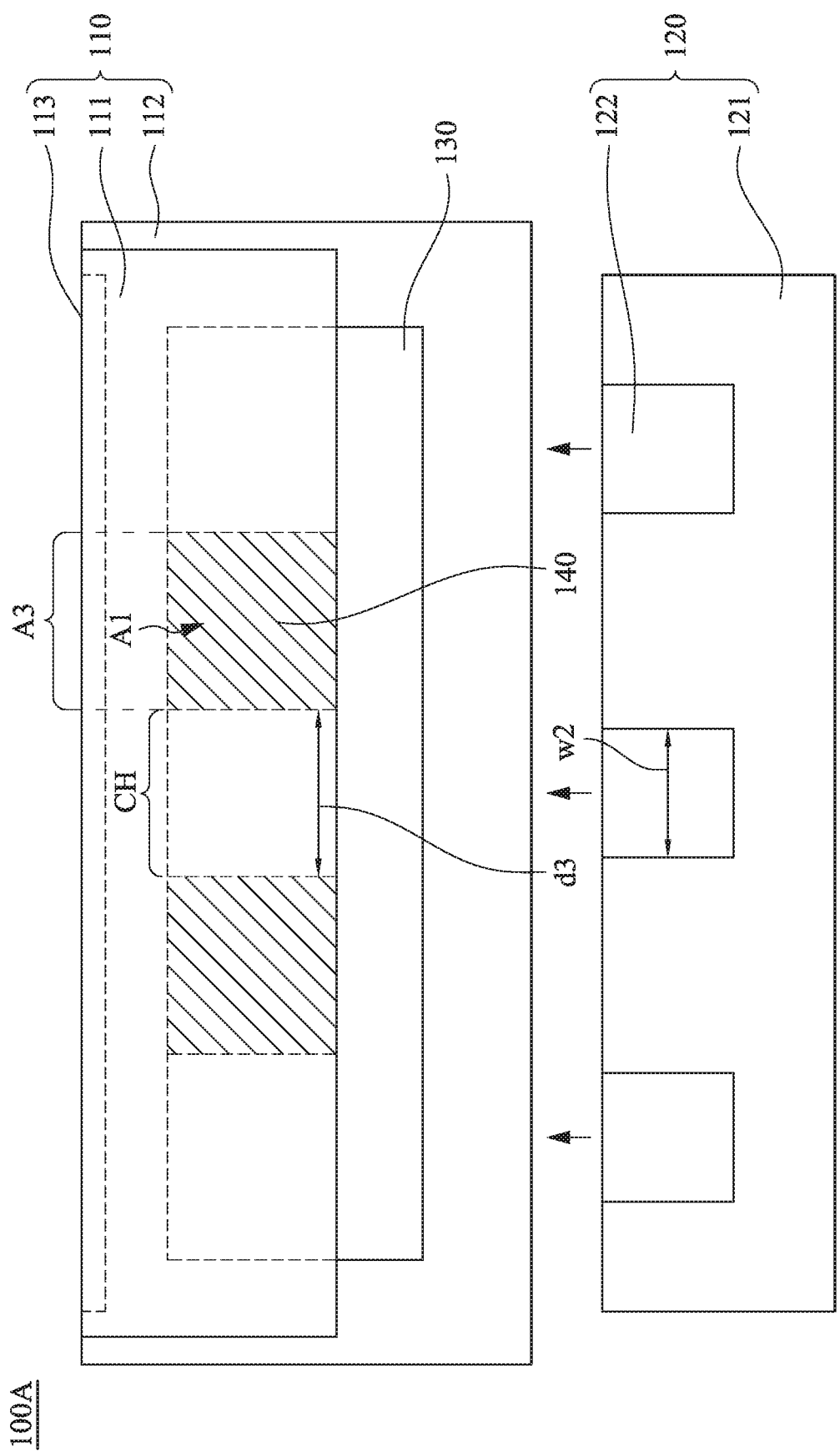
FIG. 3A is a schematic top view of the backlight module of FIG. 1 before the light emission module is assembled into a bracket.

Reference is made to FIG. 3A and FIG. 3B, in which FIG. 3A is a schematic top view of the backlight module 100A of FIG. 1 before the light emission module 120 is assembled into the bracket 110, and FIG. 3B is a schematic top view of the backlight module 100A of FIG. 1 after the light emission module 120 is assembled into the bracket 110. For clearer depiction, the first adhesive structures 140 in FIG. 3A and FIG. 3B are indicated with slanted lines. After the light emission module 120 of FIG. 3A is assembled into the bracket 110, the backlight module 100A of FIG. 1 and FIG. 3B is provided.

As illustrated in FIG. 3A and FIG. 3B, in some embodiments, the first adhesive structures 140 vertically project on the third plate 113 at a plurality of third areas A3, respectively. The light emission elements 122 vertically project on the third plate 113 at a plurality of fourth areas A4, respectively. The third areas A3 do not overlap with the fourth areas A4. The portions of the reflective film 130 which do not overlap with the adjacent two of the first adhesive structures 140 and the second plate 112 define a plurality of channels CH therebetween. The channels CH connect the third plate 113 and the environment outside the bracket 110. Therefore, the light emission module 120 can be easily assembled in the bracket 110 by aligning the light emission elements 122 with the channels CH and pushing the light emission elements 122 toward the third plate 113, and with this structure, the path of the light emission elements 122 is not be interfered by the first adhesive structures 140. In conclusion, by utilizing an unaligned configuration of the vertical projection positions of the first adhesive structures 140 on the first plate 111 of the bracket 110 and the vertical projection positions of the light emission elements 122 on the first plate 111 of the bracket 110, and an unaligned configuration of the vertical projection positions of the first adhesive structures 140 on the third plate 113 of the bracket 110 and the vertical projection positions of the light emission elements 122 on the third plate 113 of the bracket 110, the light emission elements 122 can be assembled without interference from the first adhesive structures 140.

As shown in FIG. 3A and FIG. 3B, for example, the first adhesive structures 140 are positioned between the reflective film 130 and the first plate 111 of the bracket 110 and can be extended from a side adjacent to the third plate 113 of the reflective film 130 to a side away from the third plate 113 of the first plate 111. In some embodiments, the first adhesive structures 140 can fill the space between the reflective film 130 and the first plate 111 at a direction that is vertical to the third plate 113. In some embodiments, the first adhesive structures 140 can be disposed at a side adjacent to the third plate 113 of the reflective film 130, at a side away from the third plate 113 of the first plate 111, or between these sides. The above illustrative positions of the first adhesive structures 140 are not intended to limit the present disclosure, and the position of the first adhesive structures 140 can be varied according to practical requirements.

As shown in FIG. 3A and FIG. 3B, a space between an adjacent two of the first area A1 is greater than a width of an individual one of the second areas A2. Namely, along an arrangement direction of the light emission elements 122 on the circuit substrate 121, two adjacent first adhesive structures 140 has a third distance d3 therebetween, and each of the light emission elements 122 has a width w2. The third distance d3 is greater than the width w2. A person skilled in the art can modify the size of the light emission elements 122, the spaces between the light emission elements 122 on the circuit substrate 121, and the width w2 of the first adhesive structures 140 according to practical requirements.

As shown in the embodiments discussed in FIG. 1, FIG. 2, FIG. 3A, and FIG. 3B, the profile of the first adhesive structures 140 is rectangular. In some other embodiments, the profile of the first adhesive structures 140 can be in the shape of a semi-sphere (dome), semi-cylinder, or any regular or irregular shape. A person skilled in the art can modify the profile of the first adhesive structures 140 according to practical requirements.

Figure 4:
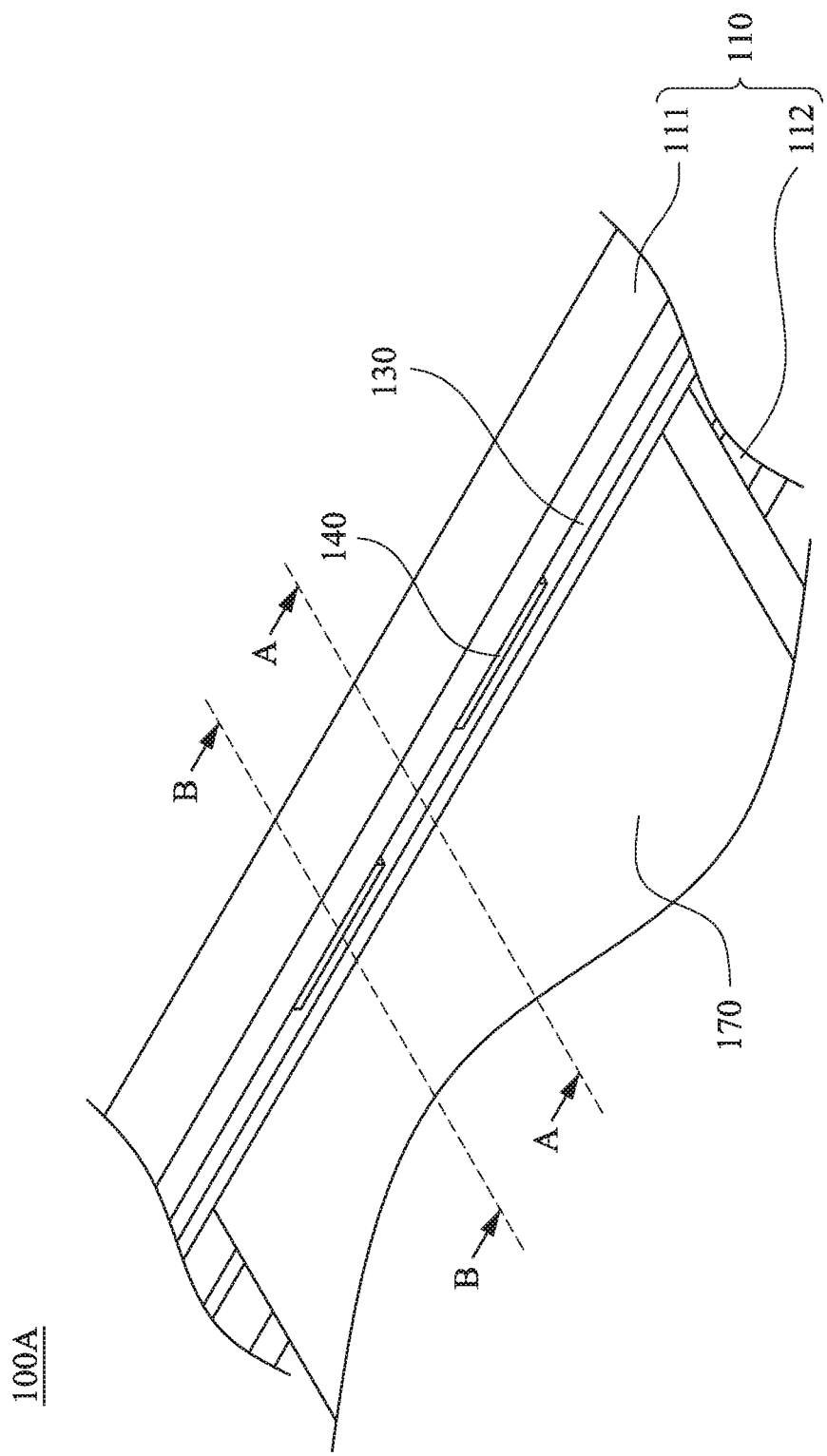
FIG. 4 is a partial perspective view of an embodiment of a backlight module with a light guide plate of the present disclosure.

Reference is now made to FIG. 4, which is a partial perspective view of an embodiment of a backlight module 100A with a light guide plate 170 of the present disclosure. In some embodiments, in order to better join the light-emitting surface of the backlight module 100A to an external module, the backlight module 100A further includes a light guide plate 170. The light guide plate 170 is partially disposed between the first plate 111 and the second plate 112.

Reference is made to FIG. 5A, which is a cross-sectional view of the backlight module 100A taken along the line A-A of FIG. 4. The light emitting surface 122a of the light emission element 122 is against a light receiving surface 170a of the light guide plate 170. In some embodiments, the light guide plate 170 may include microstructures to convert the light from the light emission elements 122 into a plane light, and the plane light is emitted from a light emitting surface 170b of the light guide plate 170. In some other embodiments, different types or different principles of the light guide plate can be utilized and should not be limited to the light guide plate 170.

As shown in FIG. 5A, each of the light emission elements 122 has a first thickness t1 from the first plate 111 to the second plate 112. The light guide plate 170 has a second thickness t2. The first thickness t1 is greater than the second thickness t2. In some embodiments, because the thickness of the light guide plate 170 is thinner than the thickness of the light emission elements 122, the thickness of the backlight module 100A can be reduced accordingly. In some embodiments, the light guide plate 170 and the light emission elements 122 are disposed on the circuit substrate 121, and a gap g is formed between a top surface 122b of each of the light emission elements 122 which is separated from the circuit substrate 121 and the light emitting surface 170b of the light guide plate 170. The gap g is substantially equal to a difference between the first thickness t1 and the second thickness t2.

As shown in FIG. 5A, the reflective film 130 is extended from the top surface 122b of the light emission elements 122 to the space between the light guide plate 170 and the first plate 111. The reflective film 130 further covers a portion of the light emitting surface 170b of the light guide plate 170. Due to the gap g between the light emission elements 122 and the light guide plate 170, the distance from the first portions of reflective film 130 above the light emission elements 122 to the second portions of the reflective film 130 above the light emitting surface 170b of the light guide plate 170 is equal to the gap g. In some embodiments, the gap g is close to an interface between the light emission elements 122 and the light guide plate 170, but the position of the gap g is not limited and can be at any suitable position. The reflective film 130 covers the top surface 122b s of the light emission elements 122 and the light emitting surface 170b of the light guide plate 170. The problem of light leakage from the light emitting surface 122a adjacent the gap g between the light emission element 122 and the light guide plate 170 can be prevented.

Figure 5B:
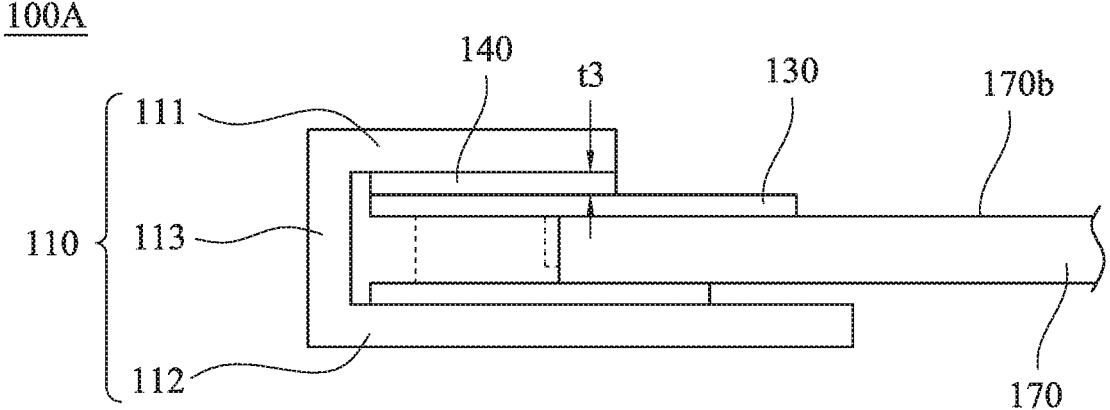
FIG. 5B is a cross-sectional view of the backlight module taken along the line B-B of FIG. 4.

Reference is made to FIG. 5B, which is a cross-sectional view of the backlight module 100A taken along the line B-B of FIG. 4. The reflective film 130 is disposed between the first adhesive structures 140 and the light guide plate 170. The first adhesive structures 140 press the reflective film 130 and position the underlying light guide plate 170, such that the light guide plate 170 is held between the first plate 111 and the second plate 112 securely.

In some embodiments, each of the first adhesive structures 140 has a third thickness t3. The third thickness t3 is substantially equal to a sum of the gap g between the light emission elements 122 and the light guide plate 170 (see FIG. 5A) and the second distance d2 between the reflective film 130 and the first plate 111 at the second area A2 (see FIG. 2 or FIG. 5A). That is, t3=g+d2. Referring also to FIG. 2, along the arrangement direction of the light emission elements 122, such design makes a difference between the first distance d1 (e.g., the third thickness t3) and the second distance d2 equal to the gap g, i.e., t3−d2=g. In some embodiments, the second distance d2 is very small or approximate to zero. Therefore, the third thickness t3 of the first adhesive structures 140 can be designed to be equal to the gap g and is still able to press the light guide plate 170 uniformly.

In some other embodiments, the first adhesive structures 140 can be made of materials that have elasticity, and the third thickness t3 can be slightly greater than the sum of the gap g and the second distance d2, such that the light guide plate 170 can be clamped between the reflective film 130 and the circuit substrate 121 firmly. In yet some other embodiments, the third thickness t3 can be slightly smaller than the sum of the gap g and the second distance d2, such that the light emission module 120 can be assembled into the bracket 110 easily. The above examples of the third thickness t3 of the first adhesive structures 140 are not intended to limit the present disclosure, and the third thickness t3 of the first adhesive structures 140 can be varied according to practical requirements.

Figure 6:
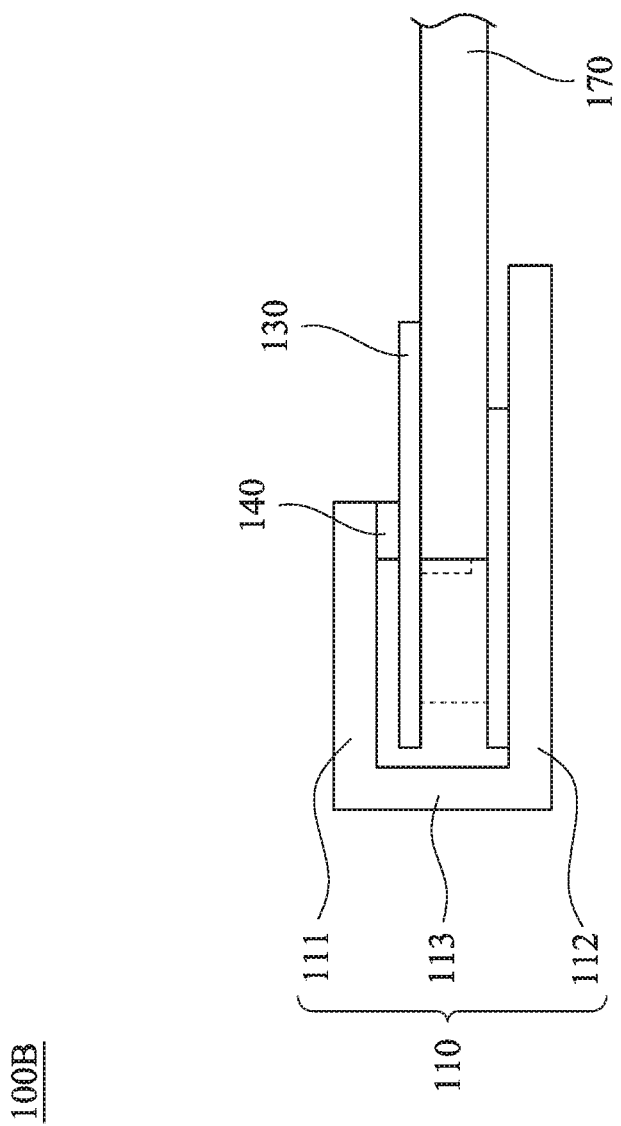
FIG. 6 is a cross-sectional view of an embodiment of the backlight module of the present disclosure.

Reference is made to FIG. 6, which is a cross-sectional view of an embodiment of the backlight module 100B of the present disclosure. FIG. 6 is cut along the line B-B as shown in FIG. 4 and has the same view as that of FIG. 5B. The backlight module 100B is similar to the backlight module 100A of FIG. 4, excluding the position of the first adhesive structures 140 of FIG. 5B. Compared to the configuration shown in FIG. 5B, in this embodiment of FIG. 6, the first adhesive structures 140 are disposed only between the light guide plate 170 and the first plate 111 and do not protrude from the light guide plate 170 and extend toward the third plate 113. In such an embodiment, the first adhesive structures 140 press the reflective film 130 and position the underlying light guide plate 170. The light guide plate 170 is clamped between the first plate 111 and the second plate 112 and therefore further secures the light emission module 120 (as shown in FIG. 5A) within the bracket 110, to prevent the light emission module 120 from being released from the bracket 110 and to fasten the light emission module 120. The number of the first adhesive structures 140 in FIG. 6 is less than that of FIG. 5A, thereby reducing the material cost and the risk of uneven coating the first adhesive structures 140.

Figure 7A:
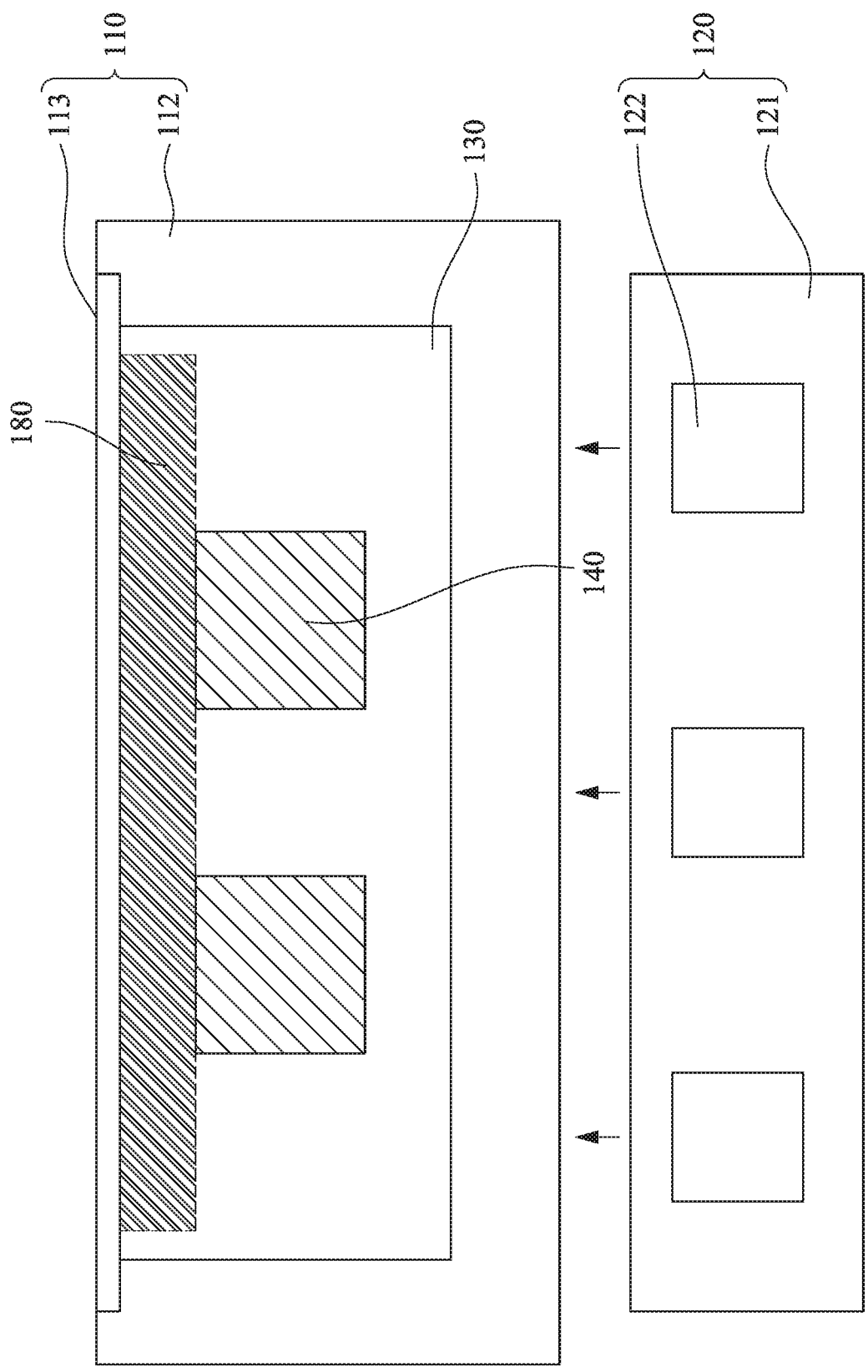
Figure 8A:
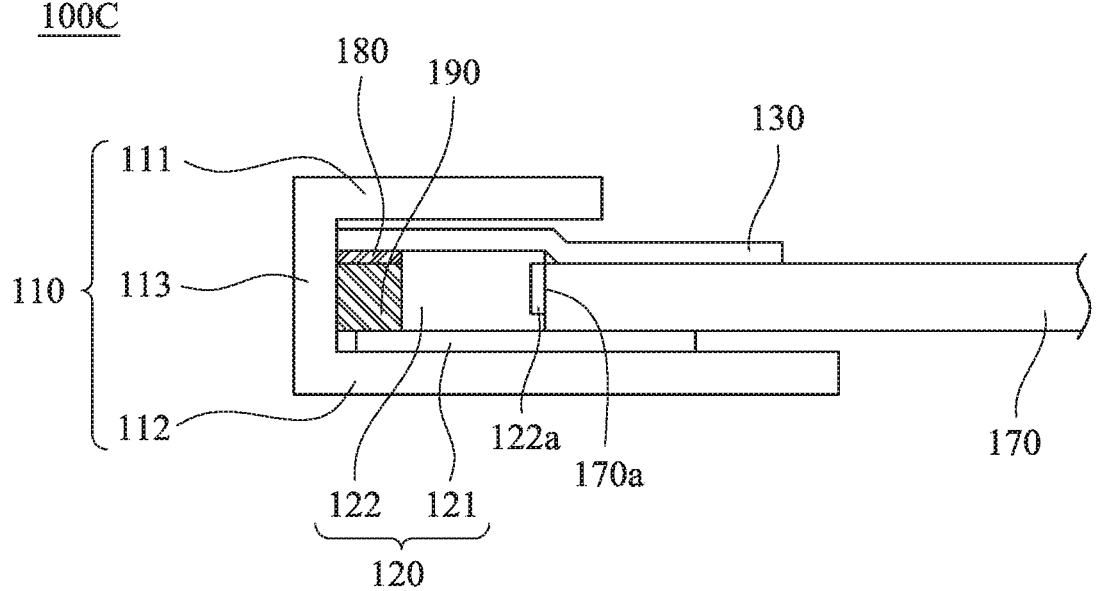
FIGS. 8A and 8B respectively are cross-sectional views taken along lines A-A and B-B of FIG. 7B.
Figure 8B:
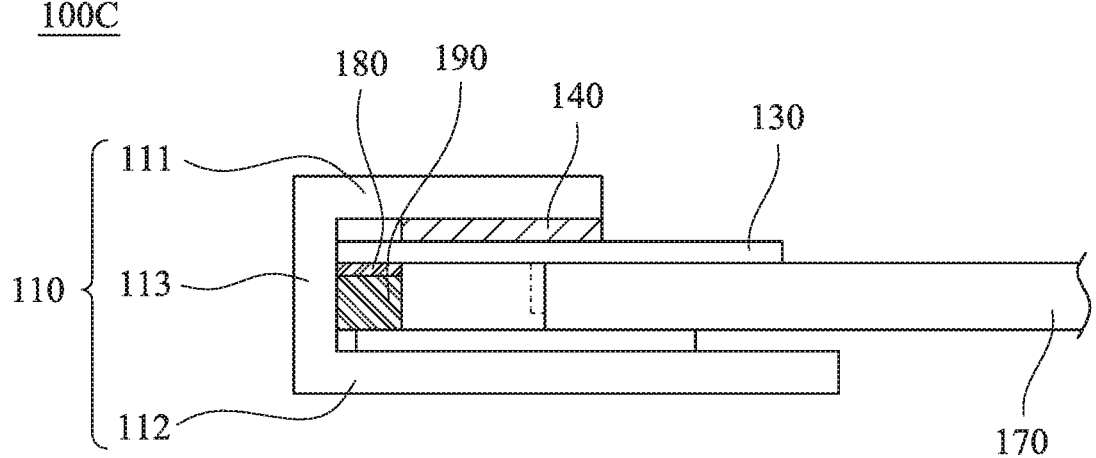

Reference is made to FIGS. 7A, 7B, 8A, and 8B. FIGS. 7A and 7B are schematic top views at different assembling stages of an embodiment of the backlight module 100C of the present disclosure. FIGS. 8A and 8B respectively are cross-sectional views taken along lines A-A and B-B of FIG. 7B. In order to simplify the drawings, the first plate 111 of the bracket 110 is not illustrated in FIG. 7A and FIG. 7B. The difference between the backlight module 100C and the backlight module 100A of FIG. 1 is that, in this embodiment, the backlight module 100C further has a second adhesive structure 180 and a buffer element 190. Other components are substantially the same as that of the backlight module 100A and a description thereof is not repeated herein. In some embodiments, the buffer element 190 is disposed at the bottom surface of the reflective film 130, e.g., at the surface of the reflective film 130 facing the second plate 112. The buffer element 190 is fixed on the bottom surface of the reflective film 130 through the second adhesive structure 180. The second adhesive structure 180 can be a double-sided tape or a glue layer, such that the buffer element 190 is adhered on the bottom surface of the reflective film 130. The material of the second adhesive structure 180 can be the same as or different from that of the first adhesive structures 140. The thickness of the second adhesive structure 180 can be the same as or slightly smaller than that of the first adhesive structures 140.

In some embodiments, the shape of the buffer element 190 is substantially the same as the shape of the second adhesive structure 180 in a top view, in which the shape is that of a rectangular bar. The buffer element 190 is disposed between the light emission elements 122 and the third plate 113 of the bracket 110, and the buffer element 190 is disposed against the third plate 113 and the light emission elements 122. After the light guide plate 170 is assembled with the light emission module 120 and the bracket 110, the buffer element 190 can provide sufficient support to force the light emitting surface 122a of the light emission elements 122 to be in direct contact with the light receiving surface 170a of the light guide plate 170, thereby improving the efficiency of the backlight module 100C.

The material of the buffer element 190 can be a polymer, for example. In some embodiments, the buffer element 190 can be made of a low coefficient of thermal expansion material, to prevent the buffer element 190 from being deformed due to being in contact with the high temperature light emission elements 122 for long periods, such that the assembling accuracy of the backlight module 100C is adversely affected. In some other embodiments, the buffer element 190 is made of a material having a high reflectance or is coated with a reflective film on the surface thereof, such that a reflectance of the buffer element 190 can be greater than 90%. The light leaked out from the light emission elements 122 and/or the light guide plate 170 can be reflected and reused again by the buffer element 190, and the problem of dark points between the light emission elements 122 can be reduced.

Figure 9A:
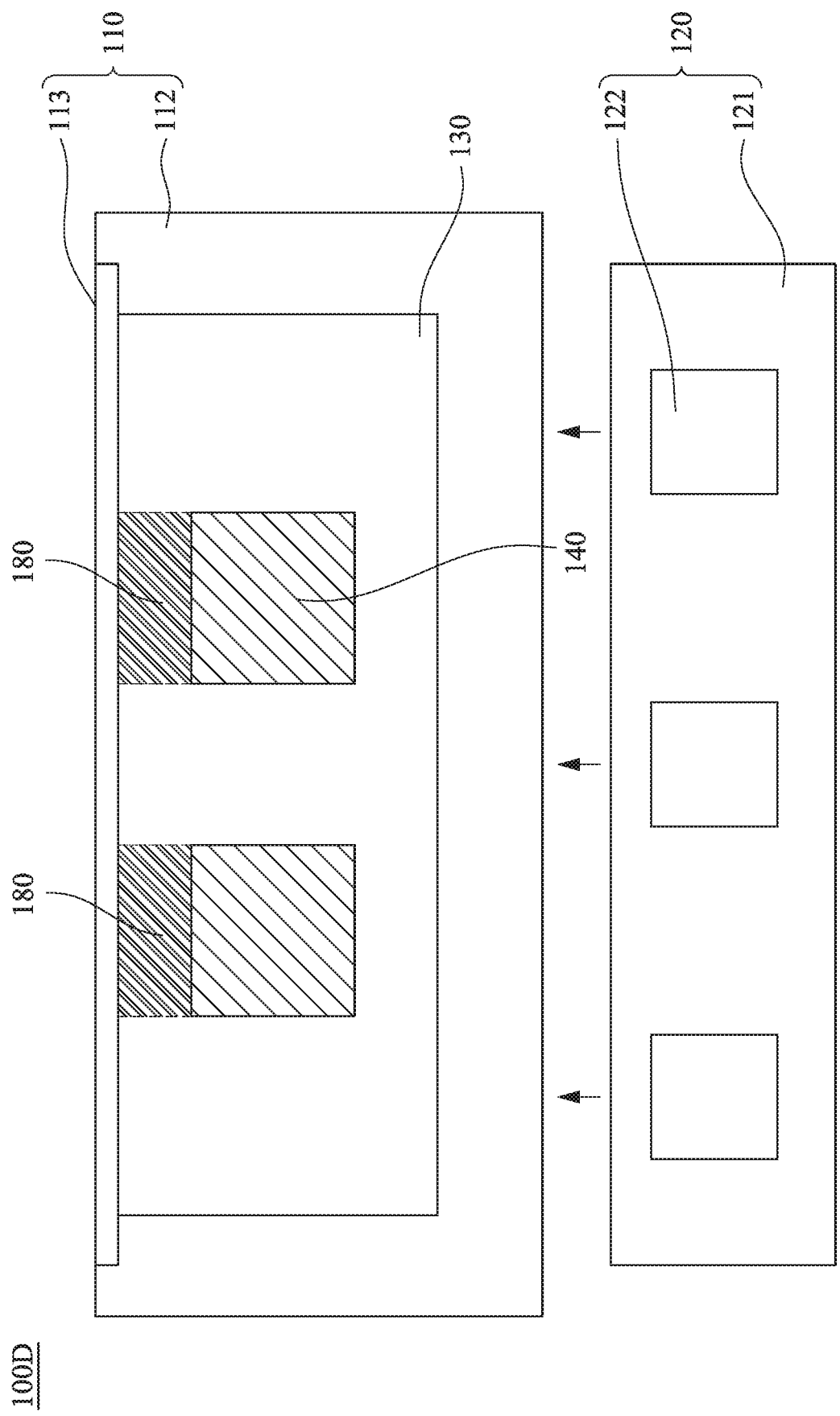
FIGS. 9A and 9B are schematic top views at different assembling stages of an embodiment of the backlight module of the present disclosure.
Figure 9B:
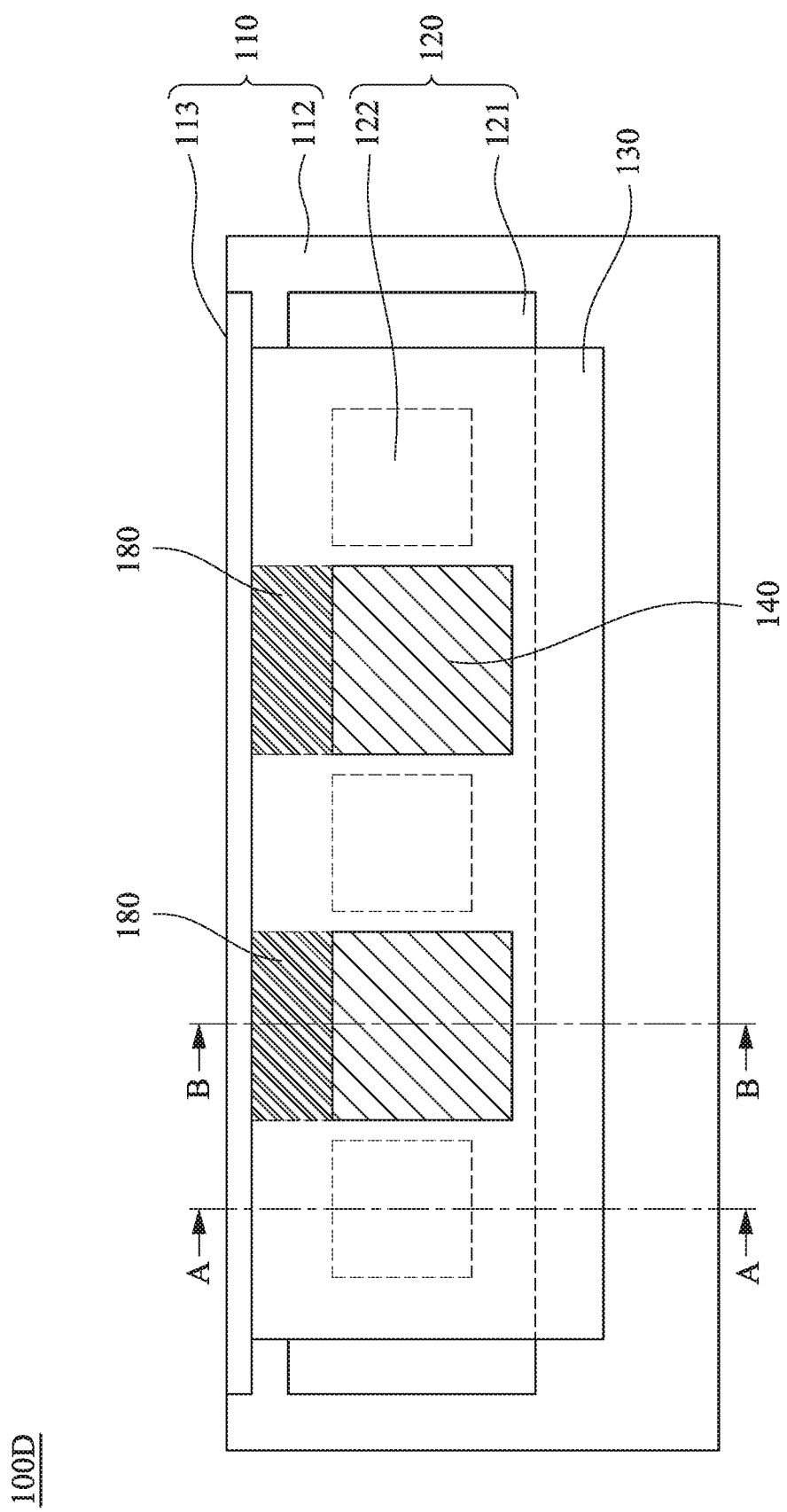
Figure 10A:
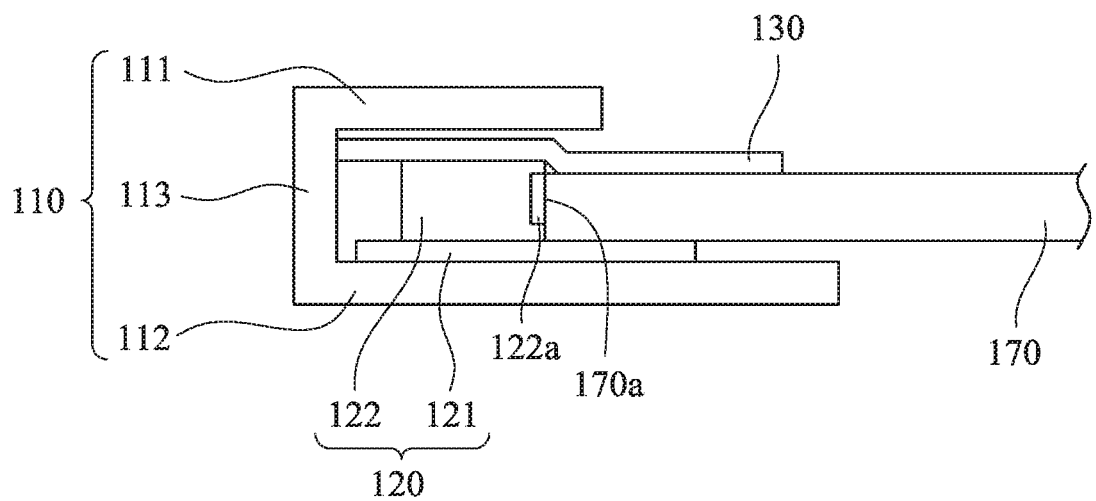
FIGS. 10A and 10B respectively are cross-sectional views taken along lines A-A and B-B of FIG. 9B.
Figure 10B:
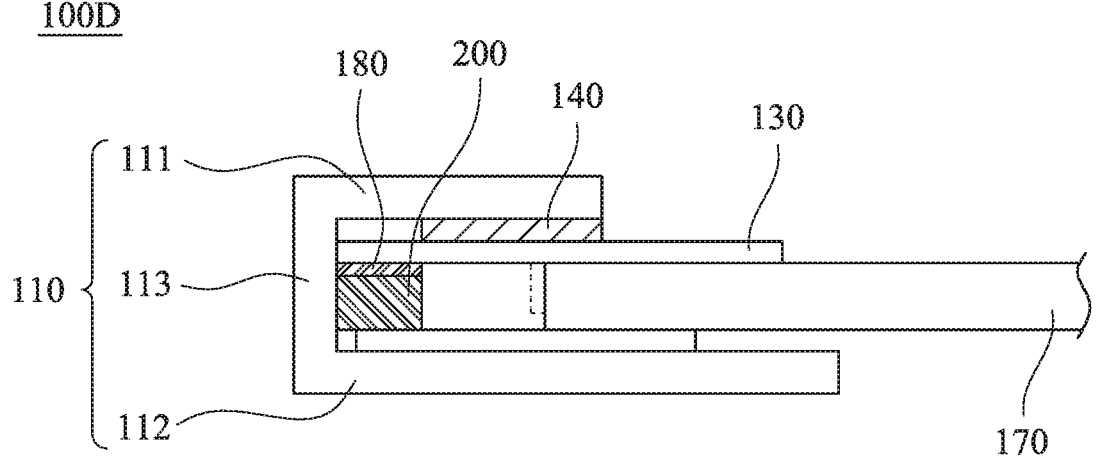

Reference is made to FIGS. 9A, 9B, 10A, and 10B. FIGS. 9A and 9B are schematic top views at different assembling stages of an embodiment of the backlight module 100D of the present disclosure. FIGS. 10A and 10B respectively are cross-sectional views taken along lines A-A and B-B of FIG. 9B. In order to simplify the drawings, the first plate 111 of the bracket 110 is not illustrated in FIG. 9A and FIG. 9B. The difference between the backlight module 100D and the backlight module 100A of FIG. 1 is that, in this embodiment, the backlight module 100D further includes a plurality of second adhesive structures 180 and a plurality of reflective elements 200. Other components are substantially the same as that of backlight module 100A, and a description thereof is not repeated herein.

The second adhesive structures 180 are utilized to fasten the reflective elements 200 on the bottom surface of the reflective film 130. The second adhesive structures 180 can be double-sided tape elements or glue layers. The reflectance of the reflective elements 200 is greater than 90%. The second adhesive structures 180 and the reflective elements 200 are disposed between the light emission elements 122 and are arranged in segments. That is, the second adhesive structures 180 and the reflective elements 200 are disposed between the first adhesive structures 140 and the third plate 113 of the bracket 110, and are not disposed between the light emission elements 122 and the third plate 113 of the bracket 110. Therefore, the light leaked out from the light emission elements 122 and/or the light guide plate 170 can be reflected and reused again by the reflective elements 200, and the problem of dark points between the light emission elements 122 can be reduced, thereby improving the efficiency of the backlight module 100D.

Figure 11A:
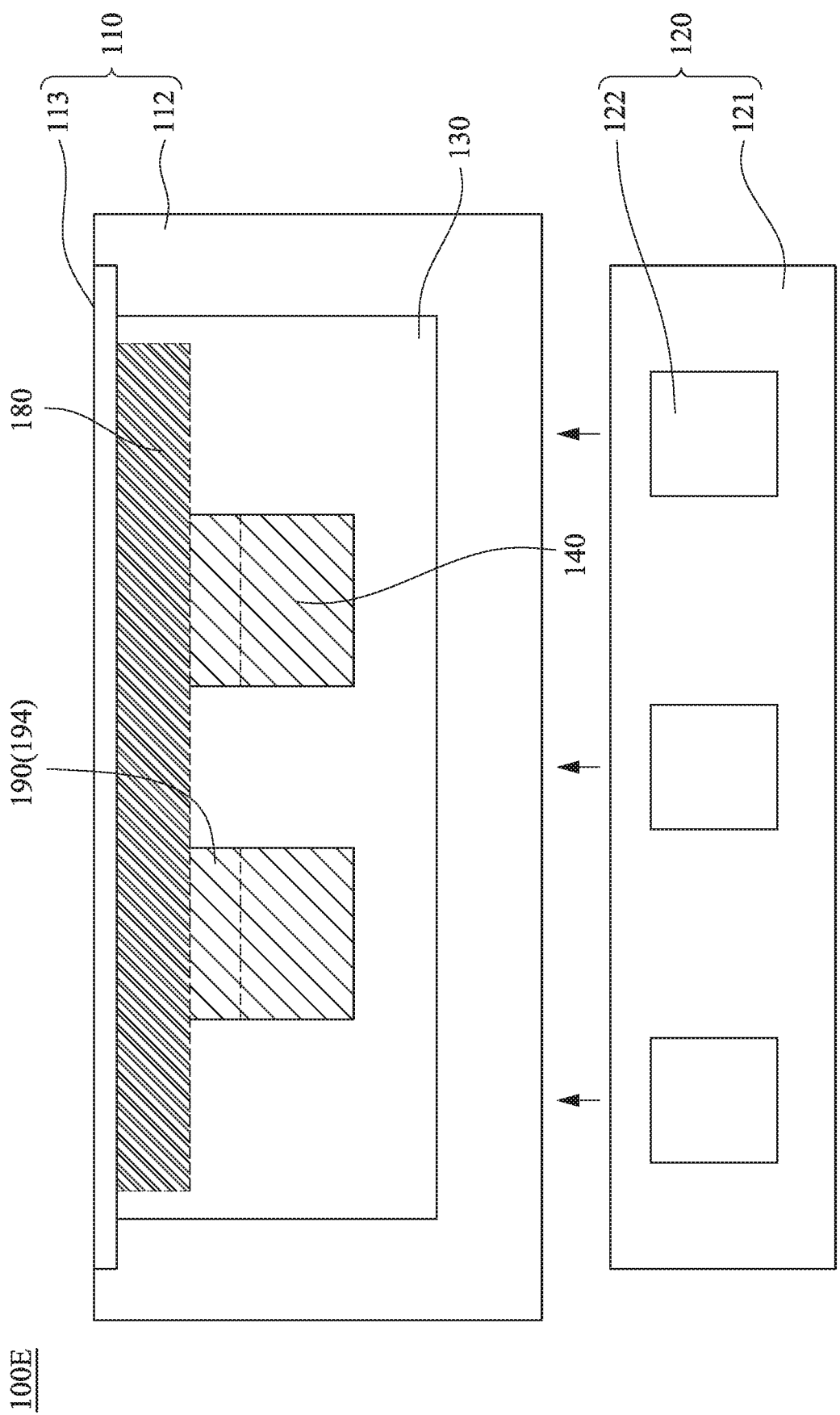
FIGS. 11A and 11B are schematic top views at different assembling stages of an embodiment of the backlight module of the present disclosure.
Figure 11B:
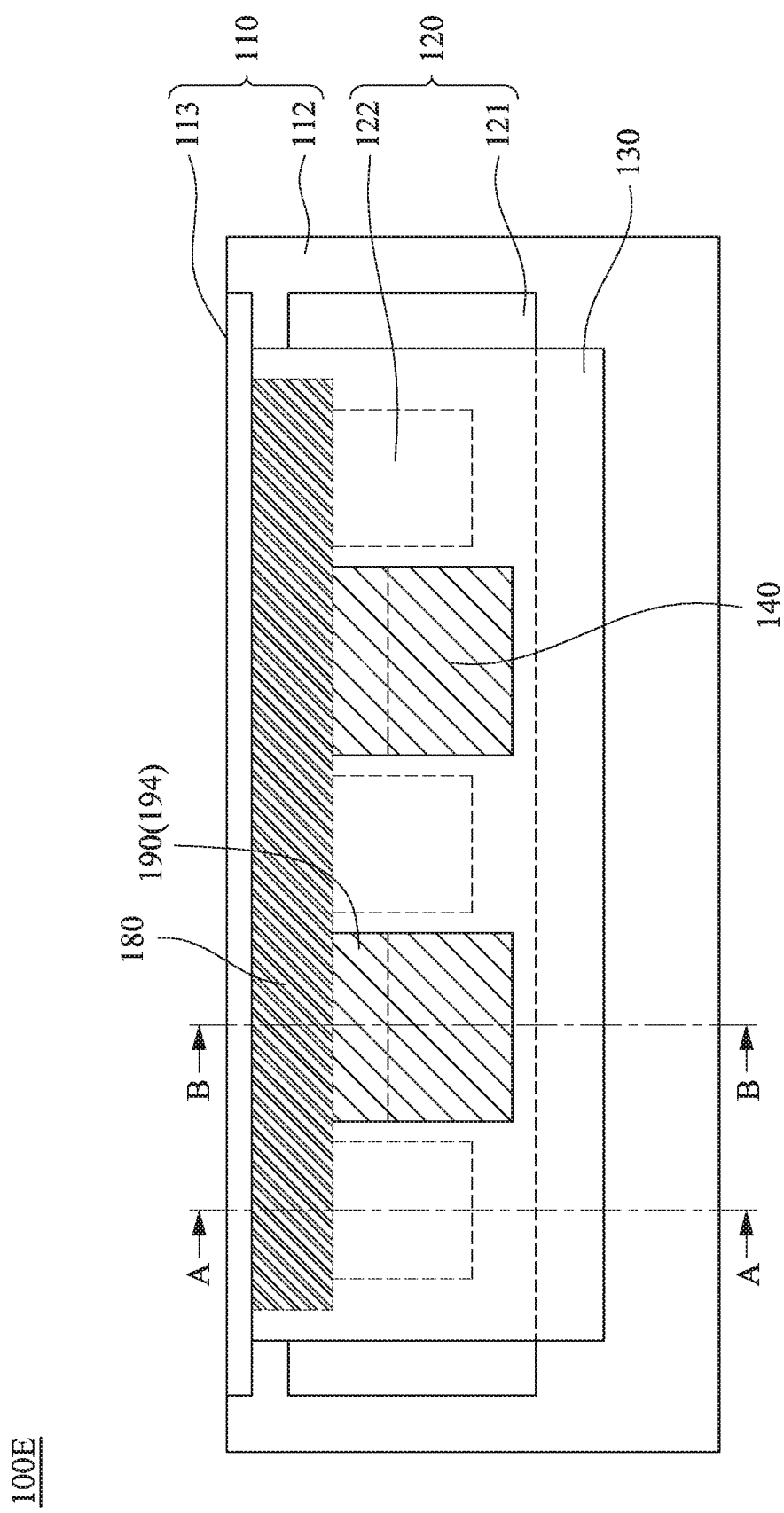
Figure 12A:
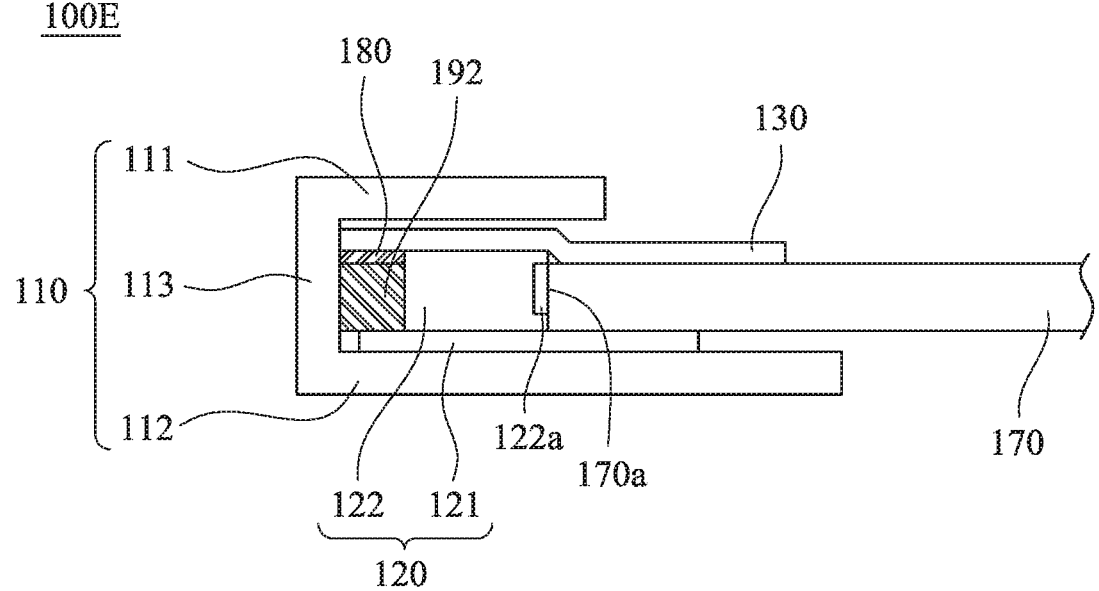
FIGS. 12A and 12B respectively are cross-sectional views taken along lines A-A and B-B of FIG. 11B.
Figure 12B:
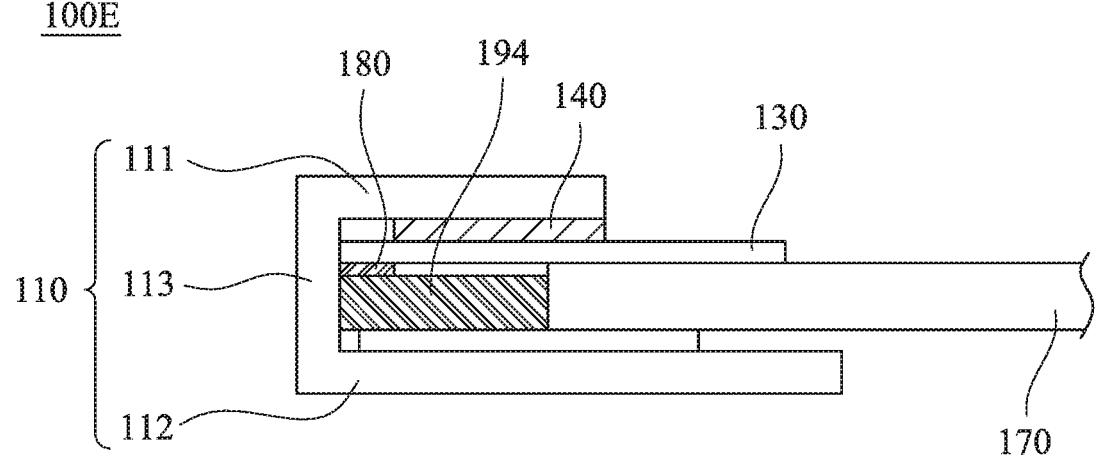

Reference is made to FIGS. 11A, 11B, 12A, and 12B. FIGS. 11A and 11B are schematic top views at different assembling stages of an embodiment of the backlight module 100E of the present disclosure. FIGS. 12A and 12B respectively are cross-sectional views taken along lines A-A and B-B of FIG. 11B. In order to simplify the drawings, the first plate 111 of the bracket 110 is not illustrated in FIG. 11A and FIG. 11B. The difference between the backlight module 100E and the backlight module 100A of FIG. 1 is that, in this embodiment, the backlight module 100E further includes a second adhesive structure 180 and a buffer element 190. Other components are substantially the same as that of backlight module 100A and a description thereof is not repeated herein.

The second adhesive structure 180 is utilized to fasten the buffer element 190 on the bottom of the reflective film 130. The second adhesive structure 180 can be a double-side taped or a glue layer. In some embodiments, the second adhesive structure 180 can be bar-shaped. The buffer element 190 includes a first portion 192 and a plurality of second portions 194 protruded from the first portion 192, in which the first portion 192 is bar-shaped, the second portions 194 extend from the first portion 192 toward the first adhesive structures 140, and the second portions 194 are disposed between the light emission elements 122.

Namely, the first portion 192 of the buffer element 190 is disposed between the light emission elements 122 and the third plate 113 of the bracket 110 and is disposed against the light emission elements 122 and the third plate 113 of the bracket 110, to provide sufficient support to force the light emitting surface 122a of the light emission elements 122 to be in direct contact with the light receiving surface 170a of the light guide plate 170. The second portions 194 of the buffer element 190 are disposed between the light guide plate 170 and the third plate 113 of the bracket 110. In some embodiments, the second portions 194 of the buffer element 190 are disposed against the light guide plate 170 and the third plate 113 of the light guide plate 170, to protect the light emission elements 122 from being squeezed and damaged by the light guide plate 170 during assembly.

In some other embodiments, the buffer element 190 can be made of a material having a high reflectance or be coated with a reflective film on the surface of the buffer element 190, such that a reflectance of the buffer element 190 can be greater than 90%. Therefore, the light leaked out from the light emission elements 122 and/or the light guide plate 170 can be reflected and reused again by the buffer element 190, and the problem of dark points between the light emission elements 122 can be reduced. In yet some other embodiments, a space is left remaining between the light guide plate 170 and the second portions 194 of the buffer element 190 which have a high reflectance. The space between the light guide plate 170 and the second portions 194 can provide a buffer space during assembly. Light can also be sufficiently reflected within the space by the buffer element 190 having a high reflectance, thereby improving light efficiency.

Figure 13A:
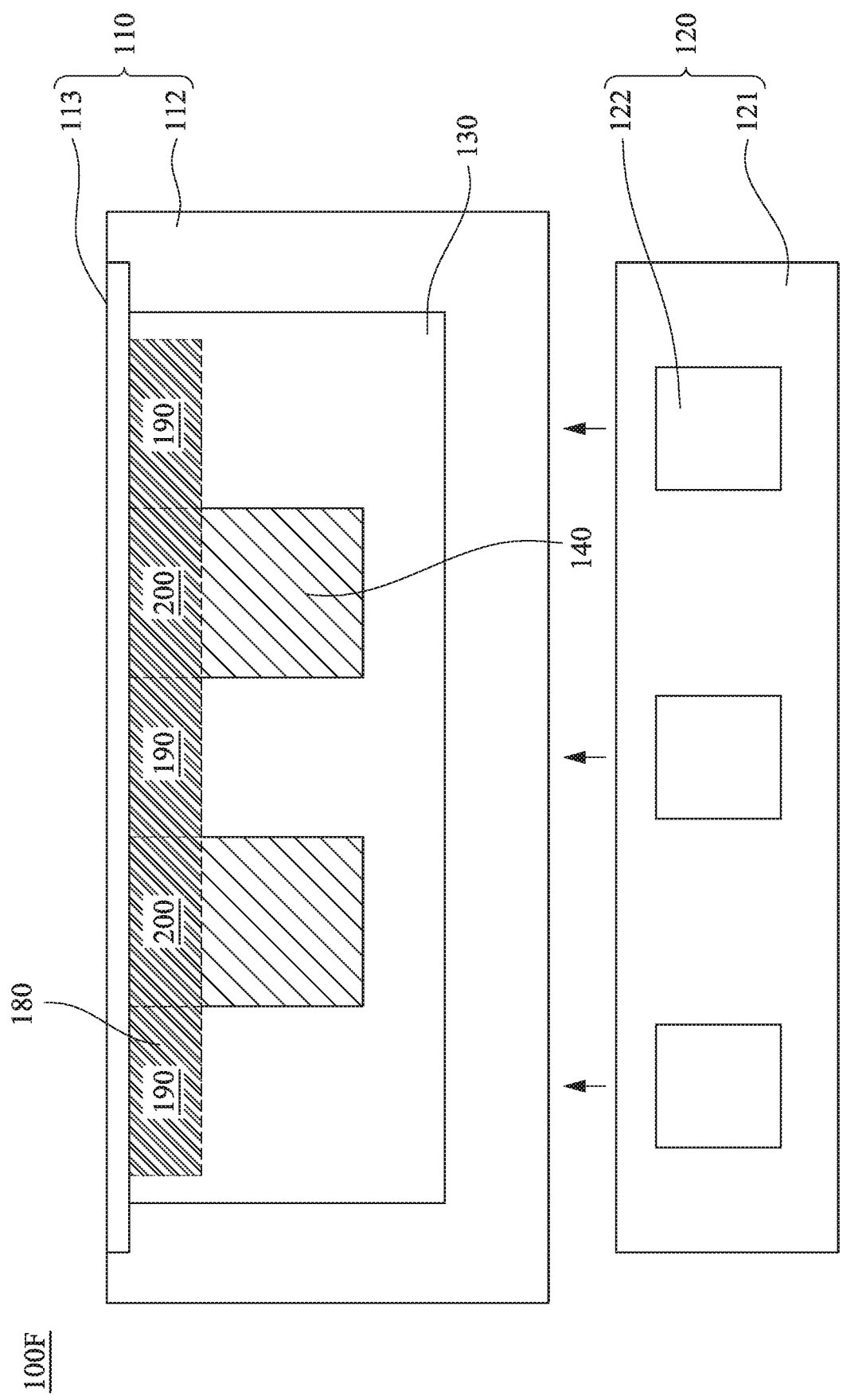
FIGS. 13A and 13B are schematic top views at different assembling stages of an embodiment of the backlight module of the present disclosure.
Figure 13B:
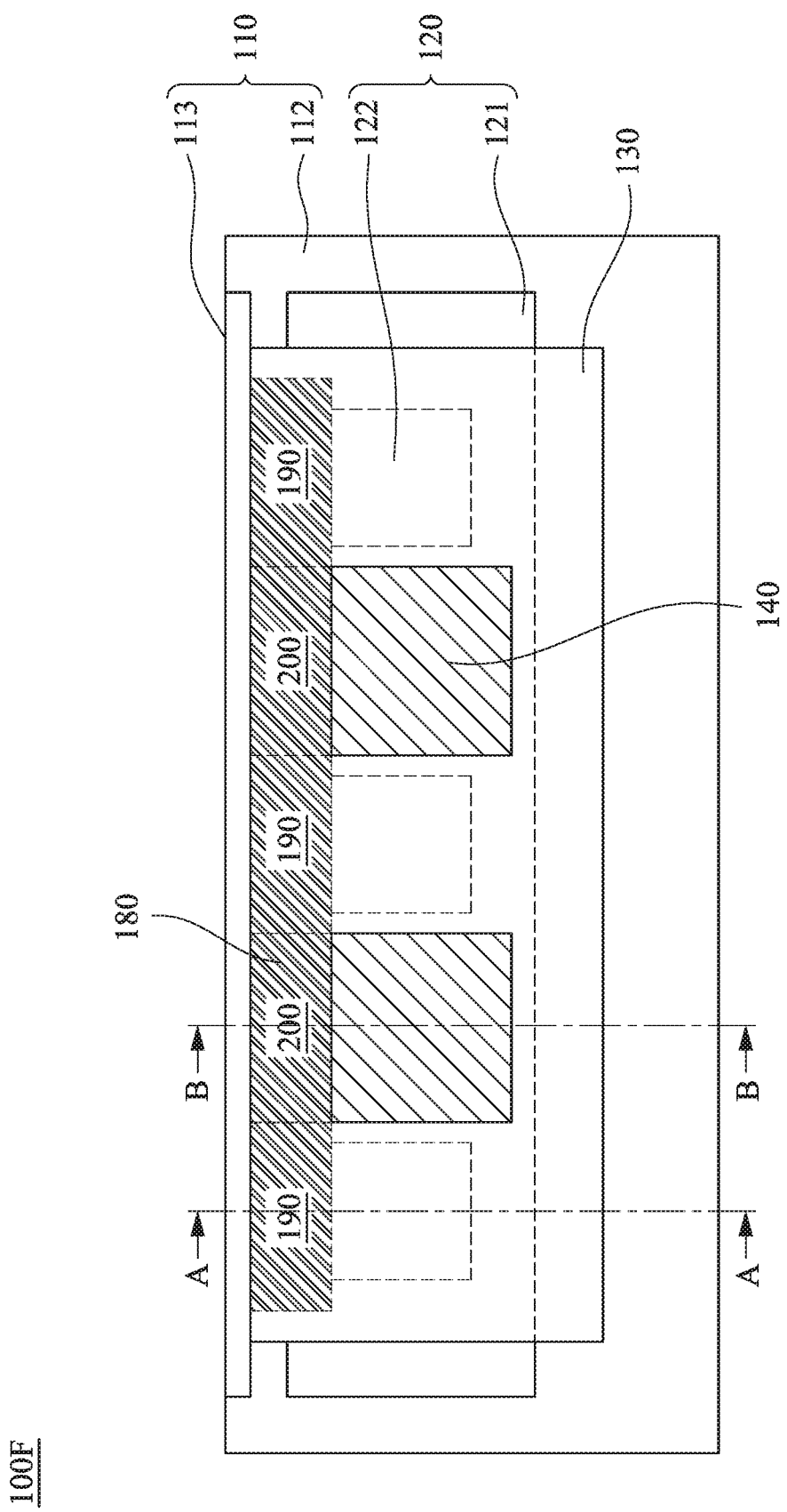
Figure 14A:
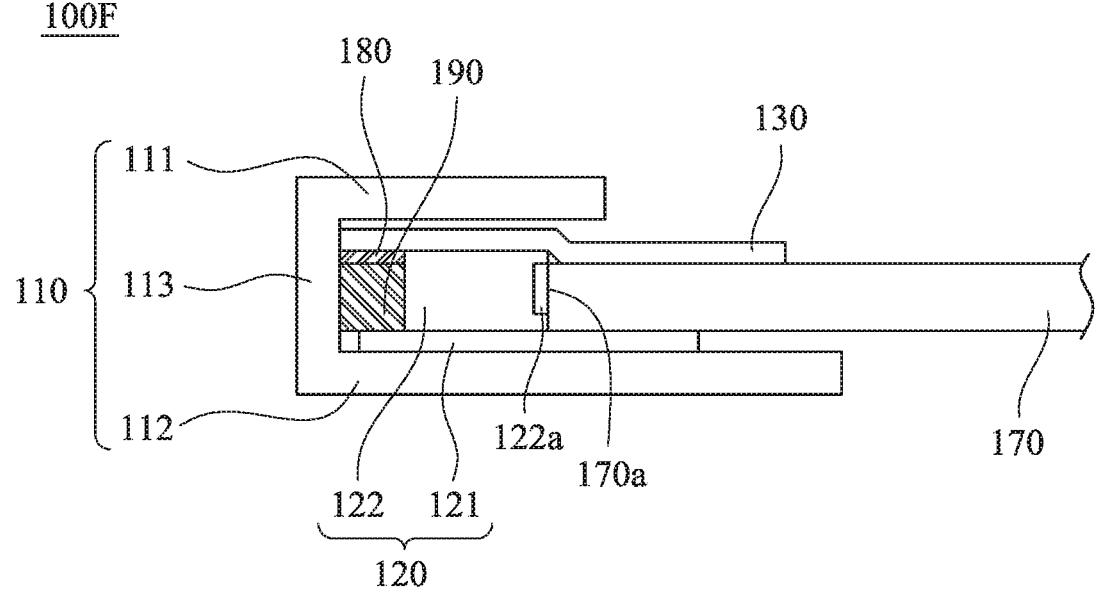
FIGS. 14A and 14B respectively are cross-sectional views taken along lines A-A and B-B of FIG. 13B.
Figure 14B:
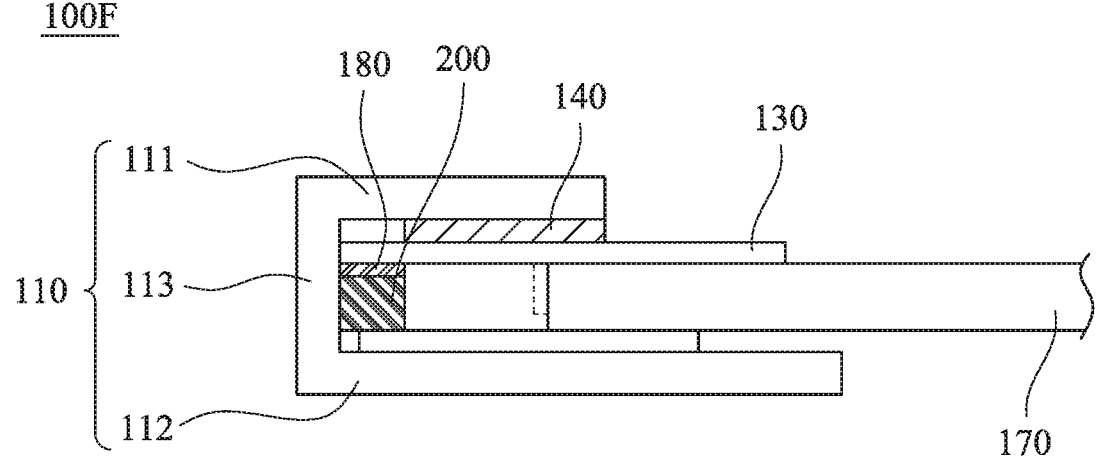

Reference is made to FIGS. 13A, 13B, 14A, and 14B. FIGS. 13A and 13B are schematic top views at different assembling stages of an embodiment of the backlight module 100F of the present disclosure. FIGS. 14A and 14B respectively are cross-sectional views taken along lines A-A and B-B of FIG. 13B. In order to simplify the drawings, the first plate 111 of the bracket 110 is not illustrated in FIG. 13A and FIG. 13B. The difference between the backlight module 100F and the backlight module 100A of FIG. 1 is that, in this embodiment, the backlight module 100F further includes a second adhesive structure 180, a plurality of buffer elements 190, and a plurality of reflective elements 200. Other components are substantially the same as that of the backlight module 100A and a description thereof is not repeated herein.

The second adhesive structure 180 is a bar-shaped double-sided tape or a glue layer, is used to fasten the buffer elements 190 and the reflective elements 200 on the bottom surface of the reflective film 130. The buffer elements 190 can be made of a low coefficient of thermal expansion material. The reflectance of the buffer elements 190 can be greater than 90%. The buffer elements 190 and the reflective elements 200 are arranged in segments and are arranged alternately along the second adhesive structure 180. For example, the projections of the light emission elements 122 on the second plate 112 do not overlap with the projections of the first adhesive structures 140 on the second plate 112. The projections of the buffer elements 190 on the second plate 112 do not overlap with the projections of the reflective elements 200 on the second plate 112. The buffer elements 190 are disposed between the light emission elements 122 and the third plate 113 and against the light emission elements 122 and the third plate 113 to provide sufficient support to force the light emitting surface 122a of the light emission elements 122 to be in direct contact with the light receiving surface 170a of the light guide plate 170. The reflective elements 200 are disposed between the first adhesive structures 140 and the third plate 113 and disposed between the light emission elements 122. Therefore, the light leaked out from the light emission elements 122 and/or the light guide plate 170 can be reflected to the light guide plate 170 again by the reflective elements 200, and the problem of dark points between the light emission elements 122 can be reduced, thereby improving light efficiency.

Figure 15A:
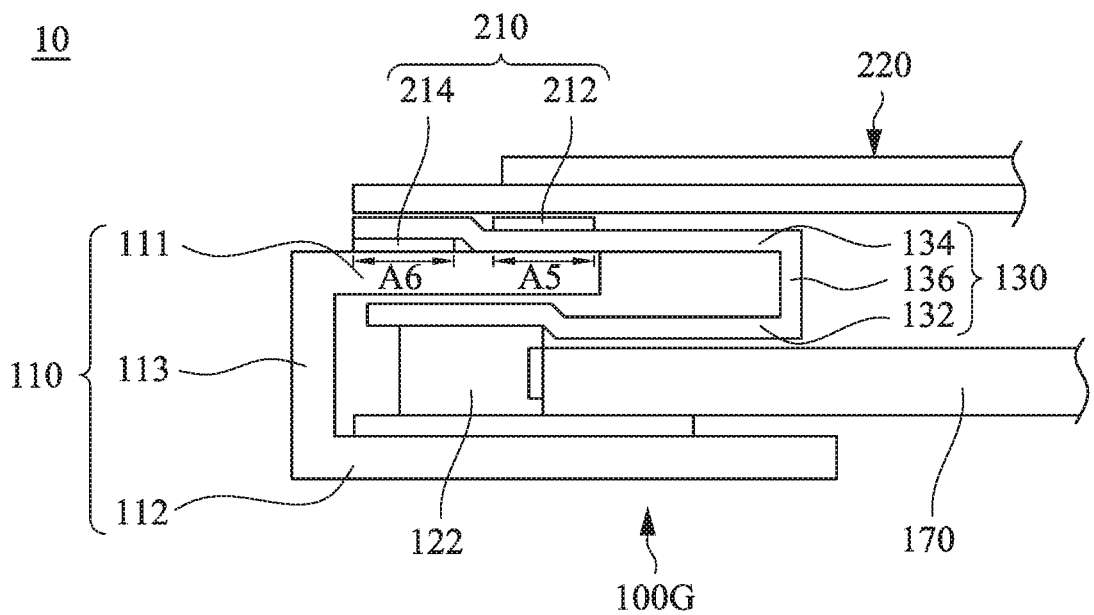
FIG. 15A and FIG. 15B are cross-sectional views of an embodiment of a display device of the present disclosure.
Figure 15B:
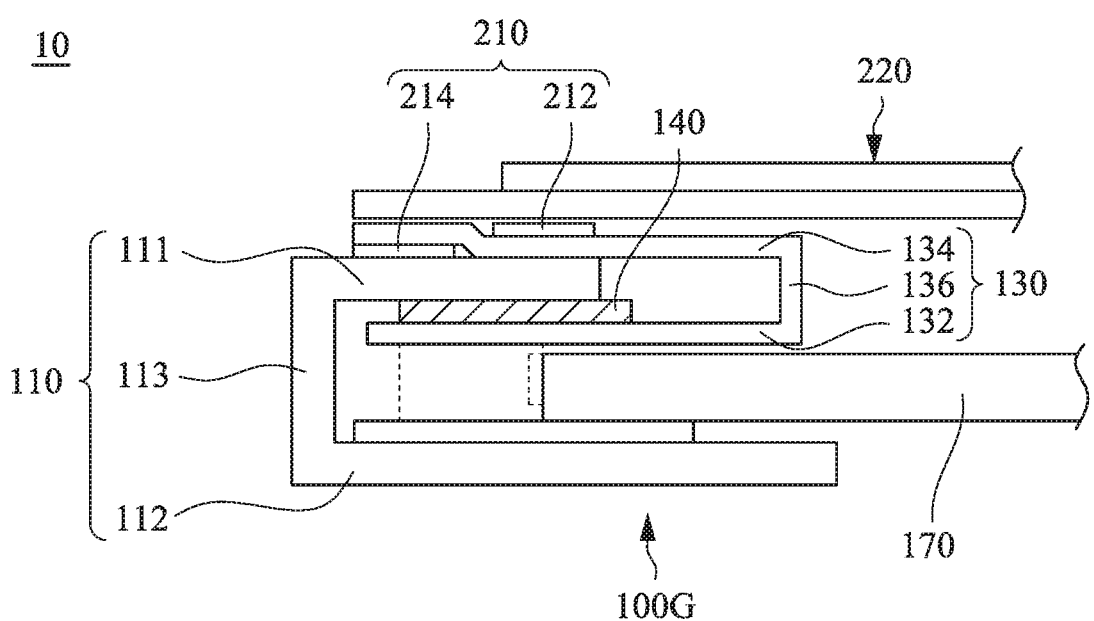

Reference is made to FIG. 15A and FIG. 15B, which respectively are cross-sectional views of an embodiment of a display device 10 of the present disclosure, in which the cross-sectional views are taken along the lines A-A and B-B as discussed above. In some embodiments, the display device 10 includes a display panel 220 disposed over the backlight module 100G. The display panel 220 can be a liquid crystal display, but is not limited thereto. In some other embodiments, the display panel 220 can be another suitable display. The reflective film 130 of the backlight module 100G is further folded between the bracket 110 and the display panel 220 to serve as a support plane for securing the display panel 220, thereby enhancing the stability of the bracket 110 supporting the display panel 220. The reflective film 130 between the display panel 220 and the bracket 110 can also reduce any rework difficulty, such as separating the display panel 220 from the bracket 110.

The reflective film 130 includes a first portion 132 disposed on the light emission elements 122 and the light guide plate 170, a second portion 134 disposed between the bracket 110 and the display panel 220, and a third portion 136 interconnecting the first portion 132 and the second portion 134. The display device 10 further includes a glue bar group 210. The glue bar group 210 includes a first glue bar 212 and a second glue bar 214. The second glue bar 214 is disposed aligned with an outer edge of the second portion 134. That is, the second glue bar 214 is closer to the third plate 113 of the bracket 110 than the second glue bar 214, but is not limited thereto. In some embodiments, the first glue bar 212 and the second glue bar 214 can be double-side tape elements, bar-shaped glue layers, or the like.

The first glue bar 212 is adhered on the bottom surface of the display panel 220. The second glue bar 214 is adhered on the first plate 111 of the bracket 110. Further, the first glue bar 212 and the second glue bar 214 are disposed at opposite surfaces of the second portion 134 of the reflective film 130. The first glue bar 212 vertically projects on the first plate 111 of the bracket 110 at a fifth area A5. The second glue bar 214 vertically projects on the first plate 111 of the bracket 110 at a sixth area A6. The fifth area A5 does not overlap with the sixth area A6. That is, the first glue bar 212 is arranged adjacent to the second glue bar 214 and has an interval therebetween. The second portion 134 of the reflective film 130 passes through the interval between the first glue bar 212 and the second glue bar 214.

Accordingly, the first glue bar 212 is adhered on the bottom surface of the display panel 220 and against the bracket 110 through the second portion 134 of the reflective film 130, directly or indirectly. The reflective film 130 itself is not sticky, and thus, the first glue bar 212 is not be adhered on the bracket 110. Similarly, the first glue bar 212 is adhered on the bracket 110 and against the bottom surface of the display panel 220 through the second portion 134 of the reflective film 130, directly or indirectly. The reflective film 130 itself is not sticky, and thus, the second glue bar 214 is not be adhered on the bottom surface of the display panel 220.

By using such a design, the first glue bar 212, the second glue bar 214, and the second portion 134 of the reflective film 130 integrally form a support plane to support the display panel 220. The width of the support plane is wider than the first glue bar 212 or the second glue bar 214, such that the display panel 220 can be supported stably and firmly by the support plane. Additionally, the first glue bar 212 and the second glue bar 214 are respectively adhered on the bottom surface of the display panel 220 and the bracket 110, and thus, the bottom surface of the display panel 220 is not adhered on the bracket 110 directly. Therefore, the display panel 220 can be separated from the bracket 110 easily, thereby improving efficiency and the success rate of any rework process. Further, the first glue bar 212 and the second glue bar 214 can be pre-adhered on the second portion 134 of the reflective film 130, such that the process of assembling the reflective film 130 can be simplified and the assembly time can be reduced.

In some embodiments, the first adhesive structures 140 are disposed between the first plate 111 of the bracket 110 and the first portion 132 of the reflective film 130 and do bot overlap with the light emission elements 122. The buffer element or the reflective element (not shown) can be optionally disposed between the light emission elements 122 and the third plate 113 of the bracket 110 or between the light guide plate 170 and the third plate 113 of the bracket 110, such that the light emission elements 122 are disposed against the light guide plate 170, thereby improving light efficiency.

Figure 16A:
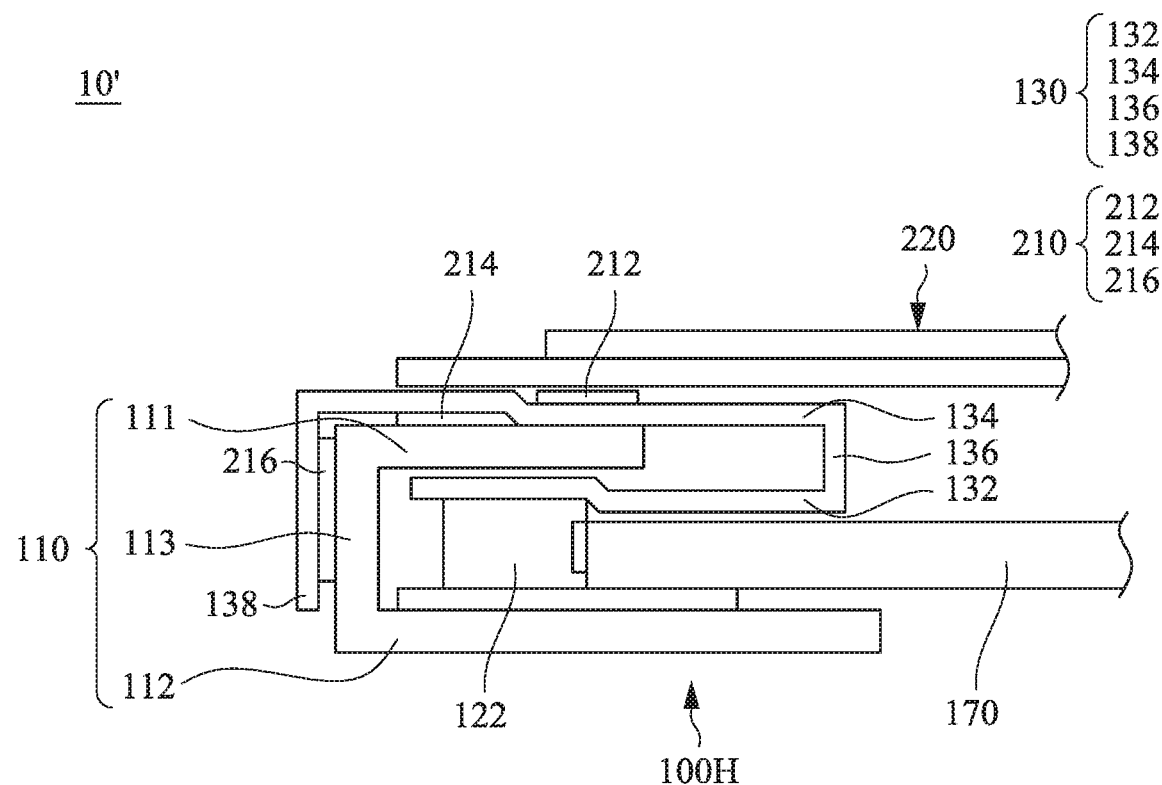
FIG. 16A and FIG. 16B are cross-sectional views of an embodiment of a display device of the present disclosure.
Figure 16B:
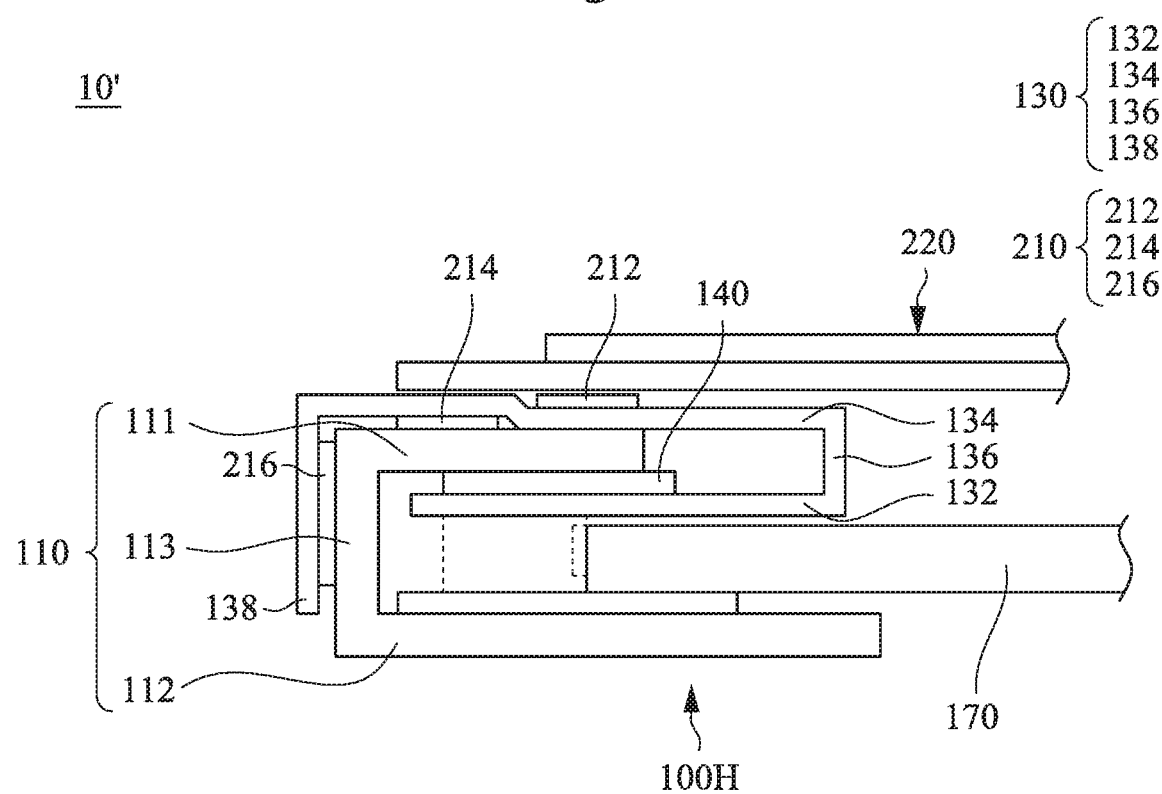

Reference is made to FIG. 16A and FIG. 16B, which respectively are cross-sectional views of an embodiment of a display device 10' of the present disclosure, in which the cross-sectional views are taken along the lines A-A and B-B as discussed above. The difference between the display device 10' and the display device 10 as discussed in FIGS. 15A and 15B is that, in this embodiment, the reflective film 130 further extends to the third plate 113 of the bracket 110, and the reflective film 130

In some embodiments, the glue bar group 210 further includes a third glue bar 216. The third glue bar 216 can be a double-side taped, for example, and is disposed and adhered on the outer surface of the third plate 113 of the bracket 110. The reflective film 130 further includes a fourth portion 138 extending from the second portion 134 and being folded on the third plate 113. The fourth portion 138 is adhered on the third plate 113 of the bracket 110 by the third glue bar 216. The buffer element or the reflective element (not shown) can be optionally disposed between the light emission elements 122 and the third plate 113 of the bracket 110 or between the light guide plate 170 and the third plate 113 of the bracket 110, such that the light emission elements 122 are disposed against the light guide plate 170, thereby improving light efficiency. By such a design, the difficulty of separating the display panel 220 from the bracket 110 can be reduced, and the strength of fastening the reflective film 130 on the bracket 110 and the display panel 220 can be improved.

Accordingly, the glue structures and the light emission components of the backlight module of the disclosure are arranged utilizing an unaligned configuration and do not overlap with each other. Moreover, the thickness of the backlight module can be reduced to thereby be in line with current trends of thinner products.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module comprising:
   a bracket having a first plate and a second plate opposite to each other, and a third plate connecting the first plate to the second plate;
   a light emission module disposed between the first plate and the second plate, and comprising a plurality of light emission elements;
   a reflective film disposed between the light emission elements and the first plate; and
   a plurality of first adhesive structures, the reflective film being mounted on the first plate of the bracket through the first adhesive structures, wherein the first adhesive structures vertically project on the first plate at a plurality of first areas respectively, the light emission elements vertically project on the first plate at a plurality of second areas respectively, and the first areas do not overlap with the second areas.

2. The backlight module of claim 1, wherein the first adhesive structures vertically project on the third plate at a plurality of third areas respectively, the light emission elements vertically project on the third plate at a plurality of fourth areas respectively, and the third areas do not overlap with the fourth areas.

3. The backlight module of claim 1, wherein at a projection plane parallel to the first plate, the first adhesive structures and the light emission elements are arranged alternately.

4. The backlight module of claim 1, wherein a distance between an adjacent two of the first area is greater than a width of an individual one of the second areas.

5. The backlight module of claim 1, wherein a plurality of air gaps are formed between the first plate and the reflective film,
wherein at a projection plane parallel to the first plate, each of the air gaps is arranged between the first area and the adjacent second area.

6. The backlight module of claim 1, wherein a plurality of air layers is formed between the second plate and the reflective film,
wherein at a projection plane parallel to the first plate, each of the air layers is arranged between an adjacent two of the light emission elements.

7. The backlight module of claim 1, wherein a first distance from the reflective film to the first plate at the first areas is greater than a second distance from the reflective film to the first plate at the second areas.

8. The backlight module of claim 1, further comprising:
a light guide plate partially disposed between the first plate and the second plate.

9. The backlight module of claim 8, wherein the reflective film is disposed between the light guide plate and the first adhesive structures.

10. The backlight module of claim 8, wherein each of the light emission elements has a first thickness, the light guide plate has a second thickness, and the first thickness is greater than the second thickness.

11. The backlight module of claim 10, wherein a thickness of the first adhesive structures is substantially equal to a difference between the first thickness and the second thickness.

12. The backlight module of claim 8, wherein a thickness of the first adhesive structures is substantially equal to a gap from a top surface of the light emission elements to a light emitting surface of the light guide plate.

13. The backlight module of claim 8, further comprising:
a plurality of reflective elements disposed between the third plate of the bracket and the light guide plate, and disposed between the light emission elements, respectively; and
at least one second adhesive structure configured to fasten the reflective elements on the reflective film.

14. The backlight module of claim 13, further comprising:
a plurality of buffer elements disposed between the third plate of the bracket and the light emission elements, and disposed between the reflective elements, respectively.

15. The backlight module of claim 1, further comprising:
a reflective element comprising:
a first portion disposed between the third plate of the bracket and the light emission elements; and
a plurality of second portions extending from the first portion toward the first adhesive structures and disposed between the light emission elements, respectively; and
at least one second adhesive structure configured to fasten the reflective element on the reflective film.

16. The backlight module of claim 1, wherein the light emission module comprises a circuit substrate, the light emission elements are disposed on the circuit substrate, and the circuit substrate is disposed between the light emission elements and the second plate.

17. The backlight module of claim 16, wherein the light emission elements are disposed between the circuit substrate and the reflective film.

18. The backlight module of claim 1, further comprising:
at least one buffer element disposed between the third plate of the bracket and the light emission elements; and
at least one second adhesive structure configured to fasten the buffer element on the reflective film.

19. A display device, comprising:
a display panel;
the backlight module of claim 1, wherein the reflective film comprises a first portion disposed on the light emission elements, a second portion disposed between the bracket and the display panel, and a third portion interconnecting the first portion and the second portion; and
a glue bar group configured to position the display panel on the backlight module, wherein the glue bar group comprises:
a first glue bar configured for mounting the second portion of the reflective film to the display panel; and
a second glue bar configured for mounting the second portion of the reflective film to the first plate of the bracket.

20. The display device of claim 19, wherein the first glue bar vertically projects on the bracket at a fifth area, the second glue bar vertically projects on the bracket at a sixth area, and the fifth area does not overlap with the sixth area.

21. The display device of claim 19, wherein the reflective film comprises a fourth portion extending from the second portion, and the glue bar group comprises a third glue bar configured for mounting the fourth portion of the reflective film to the third plate of the bracket.

* * * * *